US008552313B2

United States Patent
Atwater et al.

(10) Patent No.: US 8,552,313 B2
(45) Date of Patent: Oct. 8, 2013

(54) SYSTEMS AND METHODS FOR REDUCING WEIGHING ERRORS ASSOCIATED WITH PARTIALLY OFF-SCALE ITEMS

(75) Inventors: Charles Forrister Atwater, Eugene, OR (US); Alexander M. McQueen, Eugene, OR (US); Patrick M. O'Donnell, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 919 days.

(21) Appl. No.: 12/634,252

(22) Filed: Dec. 9, 2009

(65) Prior Publication Data
US 2010/0139989 A1 Jun. 10, 2010

Related U.S. Application Data

(60) Provisional application No. 61/267,376, filed on Dec. 7, 2009, provisional application No. 61/121,058, filed on Dec. 9, 2008.

(51) Int. Cl.
| | |
|---|---|
| *G06K 7/10* | (2006.01) |
| *G01G 19/414* | (2006.01) |
| *G01G 19/40* | (2006.01) |
| *G01G 21/28* | (2006.01) |
| *G01G 23/00* | (2006.01) |
| *G01G 21/22* | (2006.01) |
| *G01G 23/18* | (2006.01) |

(52) U.S. Cl.
USPC ............ 177/25.15; 177/45; 177/50; 177/245; 235/383; 235/462.13

(58) Field of Classification Search
USPC ................ 235/462.13, 383; 177/45, 50, 245, 177/25.15, 262
See application file for complete search history.

(56) References Cited

U.S. PATENT DOCUMENTS

| 4,000,397 A | 12/1976 | Hebert et al. |
| 4,716,281 A | 12/1987 | Amacher et al. |

(Continued)

FOREIGN PATENT DOCUMENTS

| EP | 0967565 A2 | 12/1999 |
| EP | 1039275 A1 | 9/2000 |

(Continued)

OTHER PUBLICATIONS

Perkin Elmer Technical Note TN1000, "What is a Lock-in Amplifier?", 2000, 4 pages.

(Continued)

*Primary Examiner* — Randy W Gibson
(74) *Attorney, Agent, or Firm* — Stoel Rives LLP

(57) ABSTRACT

Systems and methods are provided for reducing erroneous weighing of items by detecting items extending beyond a peripheral edge of a weigh platter associated with a data reader. For example, in response to a weigh request a scale guard module acquires data indicative of whether an item extends between the weigh platter and another surface, compares the acquired data to reference data, and based on the comparison, determines whether an item extends off the weigh platter and thus on to another surface. The scale guard module may utilize non-electromagnetic compression waves, radio waves, a portion of a data reader's scan field to scan a set of patterns extending along at least one edge of the weigh platter, an imaging based scanner to capture an image of at least one edge of the weigh platter, light beams extending along at least one edge of the weigh platter, or any combination thereof.

52 Claims, 20 Drawing Sheets

(56) References Cited

U.S. PATENT DOCUMENTS

| | | | |
|---|---|---|---|
| 4,881,606 | A | 11/1989 | Halfon et al. |
| 5,058,691 | A | 10/1991 | Sela |
| 5,143,164 | A | 9/1992 | Nahar |
| 5,260,554 | A | 11/1993 | Grodevant |
| 5,367,291 | A | 11/1994 | Fockens |
| 5,410,108 | A | 4/1995 | Williams et al. |
| 5,446,271 | A | 8/1995 | Cherry et al. |
| 5,463,211 | A | 10/1995 | Arends et al. |
| 5,747,744 | A | 5/1998 | Kraft et al. |
| 6,080,938 | A | 6/2000 | Lutz |
| 6,085,979 | A * | 7/2000 | Maddox ............... 235/462.13 |
| 6,092,838 | A | 7/2000 | Walker |
| 6,237,852 | B1 | 5/2001 | Svetal et al. |
| 6,297,750 | B1 | 10/2001 | Wingate et al. |
| 6,330,973 | B1 | 12/2001 | Bridgelall et al. |
| 6,332,575 | B1 | 12/2001 | Schuessler et al. |
| 6,354,498 | B1 | 3/2002 | Lutz |
| 6,416,183 | B1 | 7/2002 | Colpaert et al. |
| 6,547,040 | B2 | 4/2003 | Goodwin, III |
| 6,707,381 | B1 | 3/2004 | Maloney |
| 7,050,043 | B2 | 5/2006 | Huang et al. |
| 7,247,802 | B1 * | 7/2007 | Minter ................. 177/25.15 |
| RE40,071 | E | 2/2008 | Svetal et al. |
| 7,347,367 | B2 | 3/2008 | White |
| 7,482,542 | B2 * | 1/2009 | Galtier ................. 177/25.15 |
| 2003/0010541 | A1 * | 1/2003 | Oldendorf ............ 177/25.13 |
| 2004/0035928 | A1 | 2/2004 | Andersen |
| 2005/0103850 | A1 | 5/2005 | Mergenthaler et al. |
| 2006/0112023 | A1 * | 5/2006 | Horhann et al. ............. 705/407 |
| 2007/0102513 | A1 | 5/2007 | Scheb |
| 2008/0169347 | A1 | 7/2008 | Olmstead |
| 2008/0255790 | A1 | 10/2008 | Roquemore et al. |
| 2011/0121950 | A1 | 5/2011 | Izadi |
| 2011/0132985 | A1 * | 6/2011 | McQueen et al. .......... 235/454 |
| 2011/0232972 | A1 * | 9/2011 | McQueen et al. .............. 177/1 |

FOREIGN PATENT DOCUMENTS

| | | |
|---|---|---|
| JP | 11-203385 | 7/1999 |
| JP | 2000-028424 | 1/2000 |
| JP | 2006-154738 A | 6/2006 |
| JP | 2008-524587 | 7/2008 |
| WO | WO 02/33647 A1 | 4/2002 |

OTHER PUBLICATIONS

International Searching Authority, International Patent Application No. PCT/US09/067383, International Search Report and Written Opinion, Jun. 29, 2010, 11 pages.

Co-pending U.S. Appl. No. 12/956,716, filed Nov. 30, 2010.

International Searching Authority, International Patent Application No. PCT/US2010/058604, International Search Report and Written Opinion, Jul. 22, 2011, 9 pages.

Co-pending U.S. Appl. No. 13/153,281, filed Jun. 3, 2011.

McQueen et al., U.S. Appl. No. 12/956,716, Item(s) from prosecution; Office Action, Mar. 26, 2013.

McQueen et al., U.S. Appl. No. 13/153,281, Item(s) from prosecution; Office Action, Jan. 23, 2013; response to Office action, Apr. 21, 2013.

European Search Report dated Apr. 13, 2013 for European Application No. EP09832495.7 (which corresponds to present application (U.S. Appl. No. 12/634,252).

McQueen et al., U.S. Appl. No. 12/956,716, Items from prosecution; Notice of Allowance Jun. 28, 2013, Response to Office Action Jun. 21, 2013, and Terminal Disclaimer Aug. 23, 2013.

McQueen et al., U.S. Appl. No. 13/153,281, Items from prosecution; Notice of Allowance Jun. 13, 2013 and Terminal Disclaimer Aug. 23, 2013.

\* cited by examiner

SYSTEMS AND METHODS FOR REDUCING WEIGHING ERRORS ASSOCIATED WITH PARTIALLY OFF-SCALE ITEMS

RELATED APPLICATIONS

This application claims the benefit under 35 U.S.C. §119 (e) of U.S. Provisional Application No. 61/121,058, filed Dec. 9, 2008 and U.S. Provisional Application No. 61/267,376, filed Dec. 7, 2009, both of which a hereby incorporated by reference in their entireties.

TECHNICAL FIELD

The field of the present disclosure relates generally to data readers and, in particular, to reducing or otherwise mitigating weighing errors associated with data readers equipped with a weigh scale.

BACKGROUND INFORMATION

Data readers, such as barcode scanners and RFID readers, are a popular means for data acquisition in computerized processing systems. Barcode scanners are used to read and decode barcode patterns or other symbols or information imprinted on different surfaces in order to transmit the information encoded in the barcode pattern or symbol to a host processing device.

Certain data readers are equipped with a scale, such as a flush-mounted scale incorporated into point-of-sale checkout counters, to provide a space efficient solution to reading barcode information associated with an item and weighing the item. If the item or object to be weighed overhangs an edge of the scale, an inaccurate measurement may be returned by the scale. For example, if an item to be weighed partially rests on the counter, the scale may return a lower weight. By way of another example, if one or more items on the counter partially rest on the scale while another item is being weighed, the scale may return a higher weight. Thus, if the overhanging condition goes unnoticed, a customer may be overcharged or undercharged for the item.

Accordingly, the present inventors have recognized a need to detect events resulting in inaccurate weight measurements, such as when an item spans the scale and the checkout counter.

DETAILED DESCRIPTION OF EMBODIMENTS

With reference to the above-listed drawings, this section describes particular embodiments and their detailed construction and operation. The embodiments described herein are set forth by way of illustration only. In light of the teachings herein, those skilled in the art will recognize that there may be equivalents to what is expressly or inherently taught herein. For example, variations can be made to the embodiments described herein and other embodiments are possible. It is not always practical to exhaustively catalog all possible embodiments and all possible variations of the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Overview

Before describing detailed examples of systems and methods for reducing weighing errors associated with partially off-scale items, a representative data reader and associated concepts will first be described.

Figure 1:
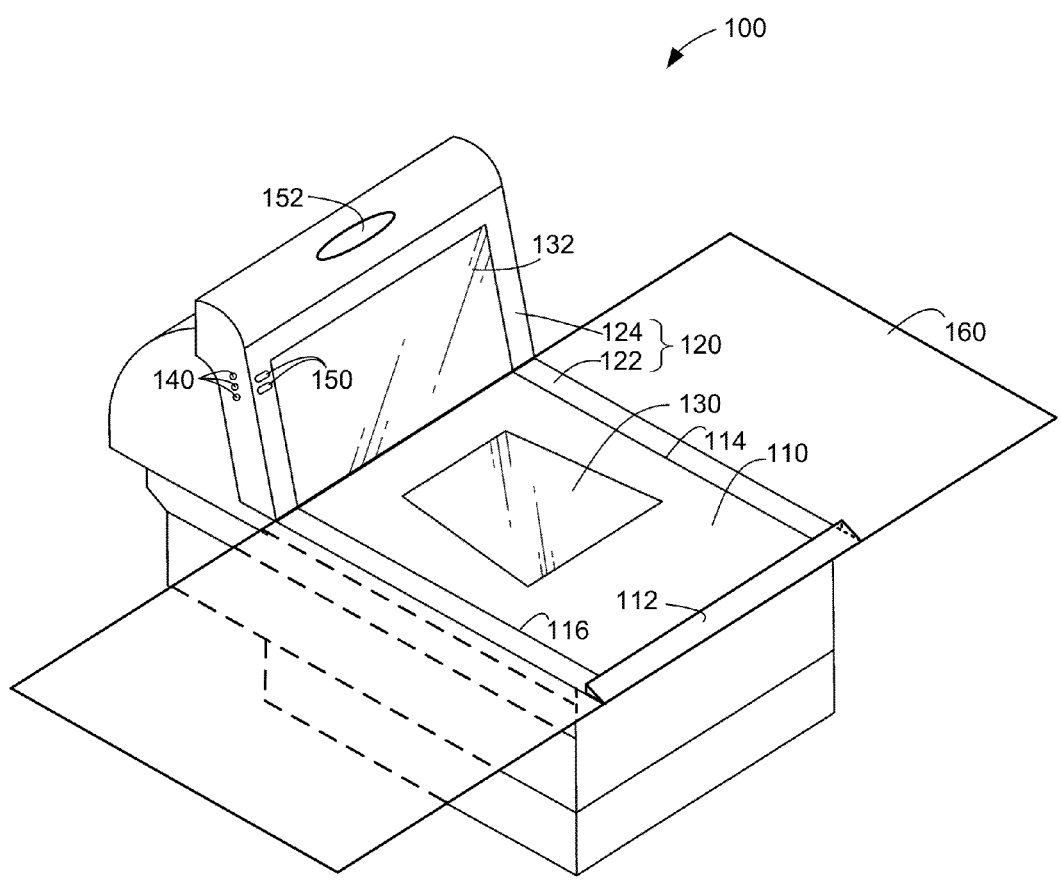
FIG. 1 is a perspective view of a multiplane scanner, according to one embodiment.

FIG. 1 is a perspective view of a data reader or scanner system 100, according to one embodiment. The scanner system 100 comprises a data reader equipped with a weigh scale comprising a weigh platter 110 for weighing retail items, such as produce or bulk items, at the point-of-sale. The weigh platter 110 may be rectangular as shown in FIG. 1, or may comprise another geometric shape, such as a polygon or curved shape. The scanner system 100 includes a housing 120 with a lower housing portion 122 and an upper housing portion 124. A data reader or optical code reader, such as imaging based scanner 180 (FIG. 2), laser based scanner 190, or both, obtains data for reading encoded symbols through a lower window 130 supported on the lower housing 122 and an upper window 132 supported on the upper housing 124. The lower window 130 is arranged in a generally horizontal plane and the upper window 132 is arranged in a generally vertical plane.

The system 100 may include input devices, such as one or more buttons 140 typically disposed on the housing 120, that allow a user to interact with the scanner system 100 (e.g., for zeroing the scale or adjusting a volume of a beep tone indicating that a bar code on an item has been successfully read by the scanner or a sound indicating an off-scale condition). The housing 120 may also include external indicia or indicators, such as scanner and scale status lights (e.g., light-emitting diodes (LEDs)) 150 or an alert 152, to notify the user of various scanner states.

The weigh platter 110 may include an integrated two-plane weigh platter (or other single-plane or multi-plane weigh platter) that allows items to be placed on a substantially horizontal portion of weigh platter 110, a substantially vertical portion of weigh platter 110, or both, to be weighed. One such two-plane weigh system is the All-Weighs® platter system available from Datalogic Scanning, Inc. of Eugene, Oreg., further described in U.S. Pat. No. RE40,071, which is hereby incorporated by reference in its entirety. A fruit rail or shoulder 112 extending above the horizontal surface and disposed at the checker-side edge of the weigh platter 110 may be provided to help rest bulky items against the vertical portion of weigh platter 110. Preferably, the scanner system 100 is supported by a checkout counter 160 so that the weigh platter 110 is substantially flush with the checkout counter 160. While the counter 160 may extend along two opposing or edges of the weigh platter 110, the counter may only extend along all or a portion of one edge of the weigh platter 110 or the counter may also extend along a foot or fruit rail edge of the weigh platter 110 or upper housing edge of the weigh platter 110. According to one embodiment, the weigh platter 110 may be separated by a gap from the counter 160 or other fixed object, such as a scanner frame or lower housing portion 122.

For purposes of description, certain sides of the weigh platter will now be defined, in this case with respect to FIG. 1 but the terminology is applicable to each of the embodiments. A top surface of the weigh platter 110 may be described as having a generally rectangular shape thus having four sides or edges defined as follows: (1) a proximal side edge is the edge nearest the upper housing portion 124, the proximal side may also be described as the customer side; (2) a distal side edge is the furthest from the upper housing portion 124 and thus next to the fruit or foot rail 112, the distal side may also be described as the checker side because it is the side normally nearest the checker in a common installation; (3) a first or left lateral side edge 114; and the second or right lateral side edge 116 is the lateral side. The left and right opposing lateral side edges 114 and 116 may be adjacent respective edges of a top surface of the checkout counter 160 or other fixed object, such as a scanner frame or lower housing portion 122.

Figure 2:
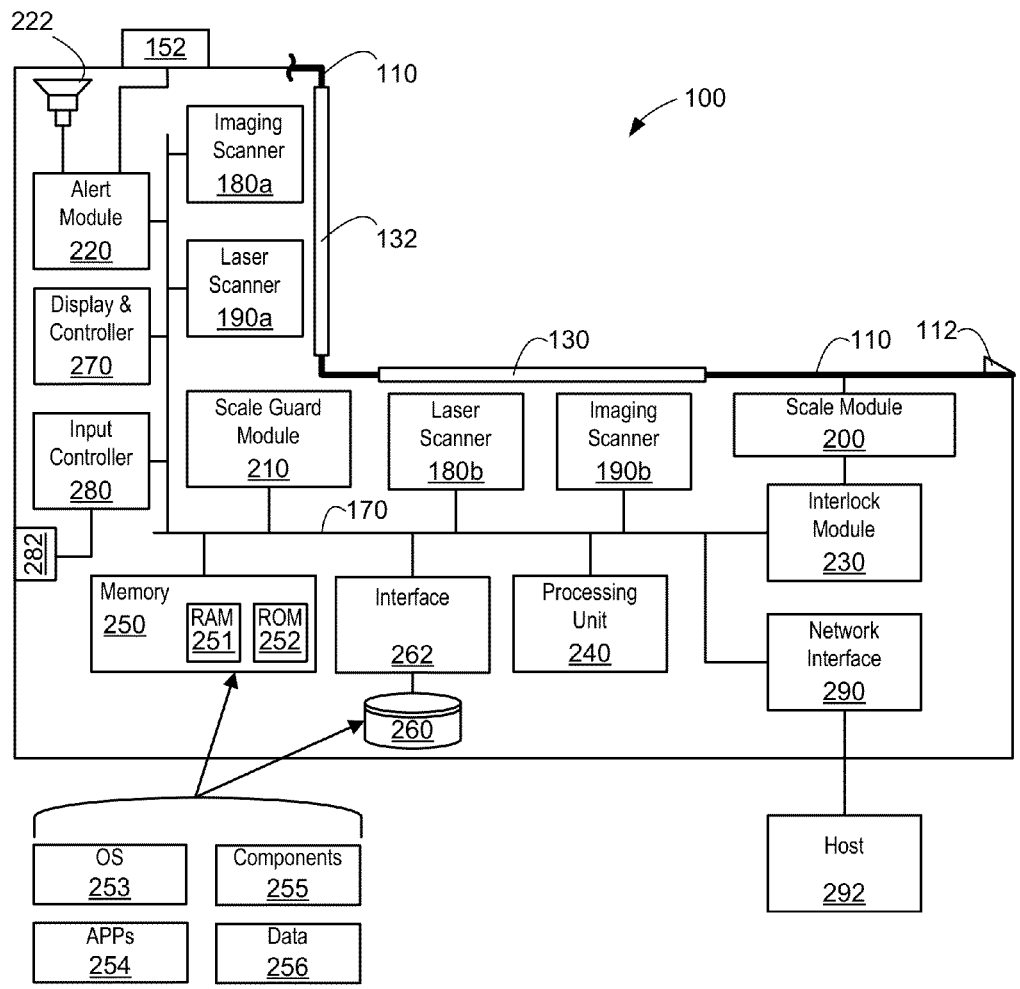
FIG. 2 is a high-level block diagram of the scanner of FIG. 1, which incorporates a scale guard module.

FIG. 2 is a block diagram showing operational components of the scanner system 100, according to one embodiment. While a bus-based architecture, based on a bus 170, is illustrated in FIG. 2, other suitable types of architectures may be employed, such as one or more of the components directly coupled or connected to each other. The scanner system 100 incorporates two types of optical code readers, namely imaging based scanners 180a and 180b and laser based scanners 190a and 190b. The imaging based scanner 180a and laser based scanner 190a attempt to read encoded symbols through the upper window 132 while the imaging based scanner 180b and laser based scanner 190b attempt to read encoded symbols through the lower window 130. Other positions or configurations of the scanners may be employed. For example, the scanner system 100 may include only imaging based scanners 180a and 180b, only laser based scanners 190a and 190b, or any combination thereof.

Imaging based scanners 180a and 180b include solid state image circuitry, such as charge coupled devices (CCDs) or CMOS imagers, and may be implemented using a one-dimensional or two-dimensional imaging array of photosensors to capture a barcode. One-dimensional CCD readers capture a linear cross section of the barcode at once, producing an analog waveform whose amplitude represents the relative darkness and lightness of the barcode. Two-dimensional CCD readers capture an entire two-dimensional image at once.

Laser based scanners 190a and 190b may comprise a flying spot laser barcode scanner that obtains barcode information by sweeping a laser spot across a barcode. The laser spot may be generated by a laser light source which is then directed towards an oscillating reflecting surface, typically a mirror. The light reflected from the barcode is collected by a photosensor, which outputs an analog waveform representing the relative spacing of the bars in the barcode. The analog signal may then be digitized and decoded into data representing the information encoded in the barcode.

The scanner system 100 may include any combination of components suitable for scanning optical codes, such as bar codes, industrial symbols, alphanumeric characters, or another machine-readable representation of information in a visual format on a surface of the object. In addition, the scanner system 100 may include other types of data readers, such as a radiofrequency identification (RFID) reader. An RFID system typically employs a transponder or tag, which is attached to the physical item to be identified, and a reader, which sends an electromagnetic signal to the transponder and then detects a response. Typically, the reader emits an RF signal which is received by the transponder after the transponder comes within an appropriate range. In response to the signal from the reader, the transponder sends a modulated RF signal back to the reader. The reader detects this modulated signal and can identify the transponder by decoding the modulated signal. After identifying the transponder, the reader can either store the decoded information or transmit the decoded signal to a computer.

A scale module or weigh scale 200 is provided to determine the weight of an item placed on the weigh platter or platform 110 (e.g., resting on the horizontal portion, vertical portion, or both). According to one embodiment, the scale module 200 includes components to measure the gravitational force acting on the item. For example, one or more load cells may be interposed between the weigh platter 110 and a frame or other rigid support of the scanner system 100. When an item is placed on the weigh platter 110, the weight of the item deflects the load cell, which generates an analog or digital signal indicative of the weight of the item. A rigid frame or spider may be interposed between the weigh platter 110 and the load cell to provide additional support for the weigh platter 110. However, the scale module 200 may be spiderless if the weigh platter 110 is sufficiently rigid itself. The load cell may comprise a machined piece of aluminum (or other material) having one or more strain gauges attached thereto. Thus, when a mechanical stress is applied to the load cell, the strain gauges generate signals indicative of the stress. In place of or in addition to the strain gauges, deflection of beam supporting the item may be measured optically.

A scale guard module 210 is provided to determine whether an item rests or partially rests on a surface other than the weigh platter 110, such as the counter 160 or other fixed object, such as a scanner frame or lower housing portion 122 (e.g., the item extends between the weigh platter 110 and the counter 160), which may affect the accuracy of the weight measurement. According to one embodiment, the scale guard module 210 is used in association with a weigh platter that is installed in a retail checkout counter or other fixed object (e.g., a supermarket checkout counter). According to another embodiment, the scale guard module 210 is used in association with a weigh platter that is installed in another checkout counter or other fixed object, such as a checkout counter or other fixed object used in connection with mail, parcel, or luggage sorting.

The scale guard module 210 may, for example, be configured to, in response to a weigh request (e.g., from host 292), acquire data indicative of whether an item extends between the weigh platter and another surface, compare the acquired data to reference data, and based on the comparison, determine whether an item extends between the weigh platter and another surface (e.g., rests partially on the checkout counter or other fixed object and partially on the weigh platter 110). The scale guard module 210 may utilize non-electromagnetic compression waves, radio waves, a portion of a data reader's scan field to scan a set of patterns extending along at least one edge of the weigh platter, an imaging based scanner to capture an image at least one edge of the weigh platter, a light beam extending along at least one edge of the weigh platter, or any combination thereof, to determine whether an item extends between the weigh platter and another surface. The scale guard module 210 may comprise hardware, software, firmware, or any combination thereof, and may comprise a set of instructions stored in a memory, such as memories 250 and 260. Various embodiments of the scale guard module 210 will be described in more detail with respect to FIGS. 5-25.

According to one embodiment, a system for reducing weighing errors associated with data readers equipped with a weigh platter comprises a scale module for determining the weight of an item placed on the weigh platter and a non-light-beam-based scale guard module configured to, in response to a weigh request received from a host and without transmitting a light beam along an edge of the weigh platter at a predetermined distance above a surface of the weigh platter, acquire data indicative of whether an item extends between the weigh platter and another surface, compare the acquired data to reference data, and based on the comparison of the acquired data to the reference data, determine whether an item extends between the weigh platter and another surface.

The non-light-beam-based scale guard module may, according to one embodiment, utilize non-electromagnetic compression waves to determine whether an item extends between the weigh platter and another surface. According to another embodiment, the non-light-beam-based scale guard module may comprise an array of emitters extending along opposing edges of the weigh platter and configured to transmit non-electromagnetic compression waves, a sensor configured to detect incident compression waves from the emitters, and a controller communicatively coupled to the sensor, the controller configured to determine whether an item extends between the weigh platter and another surface by monitoring the sensor for an alteration of one or more compression waves transmitted by the emitters. According to still another embodiment, the non-light-beam-based scale guard module utilizes radio waves to determine whether an item extends between the weigh platter and another surface. According to still a further embodiment, the non-light-beam-based scale guard module comprises the weigh platter configured to form a radiating antenna for transmitting electromagnetic waves across at least one edge of the weigh platter, a set of receiving antennas configured to receive the electromagnetic waves from the weigh platter, and a RF receiver coupled to the set of receiving antennas and configured to monitor the set of receiving antennas for alterations in the electromagnetic waves indicative of whether an item extends between the weigh platter and another surface.

According to yet another embodiment, the non-light-beam-based scale guard module utilizes a portion of a scan field of the data reader to scan a set of patterns extending along opposing edges of the weigh platter to determine whether an item extends between the weigh platter and another surface. According to still another embodiment, the non-light-beam-based scale guard module comprises a pattern extending along opposing edges of the weigh platter, an optical code reader, such as an imaging based scanner or a laser based scanner, configured to detect at least a portion of the pattern on each edge of the weigh platter, and a controller communicatively coupled to the optical code reader and configured to determine whether an item extends between the weigh platter and another surface based on whether the item interrupts either of the patterns extending along opposing edges of the weigh platter. According to yet another embodiment, the non-light-beam-based scale guard module utilizes an imaging based scanner to capture an image of opposing edges of the weigh platter to determine whether an item extends between the weigh platter and another surface. According to still another embodiment, the non-light-beam-based scale guard module comprises an imager for capturing an image of at least a portion of the weigh platter and a processor communicatively coupled to the imager, the processor configured to determine whether an item extends between the weigh platter and another surface by comparing the captured image of the weigh platter with a reference image.

Other examples of systems and methods for reducing weighing errors associated with data readers equipped with a weigh platter are described in U.S. Provisional Application No. 61/267,376, filed Dec. 7, 2009. For example, the scale guard module 210 may comprise a light source disposed in or on a housing of a scanner for producing a light beam along an edge of the weigh platter, a detector for receiving the light beam, the detector disposed in or on the housing, and a light guide or pipe disposed in the weigh platter for routing the light beam to the detector, wherein the detector is operative for detecting an interruption of the light beam due to an item overhanging an edge of the weigh platter. By way of another example the scale guard module 210 may comprise one or more light sources, which are highly divergent, pointed upward at an angle towards a gap between the weigh platter peripheral edge and a scanner housing frame (or the checkout counter if the scanner-scale does not include such a frame), the light producing fan shaped beams which are partially obstructed by the perimeter frame and weigh platter. The portion of light beams which do not strike any objects crossing the gap essentially form planes of light exiting the air gap in the substantially vertical direction, this plane of light may be referred to as a light curtain. When an object placed on the weigh platter such that a portion of it extends across the air gap, some of the light rays propagating up and out of the gap strike the object scattering light rays, some of which are sensed by the detector with the system then alerting the operator of the off scale item.

An alert module 220 may be provided to notify the user that an item may not be accurately weighed (e.g., the item extends between the weigh platter 110 and the counter 160). For example, the alert module 220 may activate a visual indication or light source, such as an alert light or LED 152, to notify the user whether or not the item extends between the weigh platter 110 and the counter 160. The alert 152 may emit light to indicate an acceptable condition, a perimeter violation, or both (e.g., via different colors). The alert 152 may be mounted in various locations, such as on the upper housing portion 124, the lower housing portion 122, or within the housing 120 so that the visual indication is visible through air gaps between the weigh platter 110 and the counter 160. By way of another example, the alert module 220 may activate an audible indication (via a speaker 222) of whether or not the item extends between the weigh platter 110 and the counter 160. According to a one embodiment, the alert module 220 is configured to indicate which edge of the weigh platter the item spans so that the user knows where to look for the overhanging item. For example, there may be an alert 152 for each edge of the weigh platter 110.

An interlock module 230 may be provided to disable the weighing function (or the reporting thereof) if an item is detected by the scale guard module 210 as extending between the weigh platter 110 and the counter 160 or other fixed object. The interlock module 230 may be configured to disable the weighing function until the item is detected as no longer extending between the weigh platter 110 and the counter 160 or other fixed object. The interlock module 230 may be implemented in hardware, software, firmware, or any combination thereof. The scanner system 100 may also include an override module, such as a switch or button, to allow a transaction to proceed even if an item extends between the weigh platter 110 and the counter 160 (e.g., if the scale guard module is not functioning properly).

The scanner system 100 may include a number of other components that interface with one another via the bus 170, including a processor 240, memories 250 and 260, a display controller and display device 270, an input controller 280, and a network interface 290. The processor 240 may be any commercially available processor or other logic machine capable of executing instructions. Additionally, more than one processor may be provided. The display controller and display device 270 may be provided to present data, menus, and prompts, and otherwise communicate with the user via one or more display devices, such as a transmissive or reflective liquid crystal display (LCD), cathode ray tube (CRT) display, or other suitable display.

The standard input controller 280 may be provided to receive user input from a keyboard, a pointing device, or other wired/wireless input devices. Other input devices may be included, such as a microphone, touchscreen, touchpad, and trackball. While the input devices may be integrated into the scanner system 100 and coupled to the processor 240 via the input controller 280, input devices may also connect via other interfaces, such as a connector 282. The connector 282 may include one or more data interfaces, bus interfaces, wired or wireless network adapters, or modems for transmitting and receiving data. Accordingly, the input controller 280 may include one or more of hardware, software, and firmware to implement one or more protocols, such as stacked protocols along with corresponding layers. Thus, the connector 282 may function as one or more of a serial port (e.g., RS232), a Universal Serial Bus (USB) port, and an IR interface. The input controller 280 may also support various wired, wireless, optical, and other communication standards.

The network interface 290 may be provided to communicate with one or more hosts 292 or other devices. For example, data gathered by, or decoded by, the image based scanners 180 or laser based scanners 190 may be passed along to the host computer 292. The network interface 290 may facilitate wired or wireless communication with other devices over a short distance (e.g., Bluetooth™) or nearly unlimited distances (e.g., the Internet). In the case of a wired connection, a data bus may be provided using any protocol, such as IEEE 802.3 (Ethernet), Advanced Technology Attachment (ATA), Personal Computer Memory Card International Association (PCMCIA), and USB. A wireless connection may use low or high powered electromagnetic waves to transmit data using any wireless protocol, such as Bluetooth™, IEEE 802.11b (or other WiFi standards), Infrared Data Association (IrDa), and radiofrequency identification (RFID).

The scanner system 100 may include memory 250, which may be implemented using one or more standard memory devices. The memory devices may include, for instance, RAM 251, ROM 252, and EEPROM devices, and may also include magnetic or optical storage devices, such as hard disk drives, flash memory, CD-ROM drives, and DVD-ROM drives. The scanner system 100 may also include an interface 262 coupled to an internal hard disk drive 260. In addition, the interface 262 may also be coupled to a magnetic floppy disk drive (not shown), an optical disk drive (not shown), or another drive and may be configured for external drive implementations, such as over a USB, IEEE 1194, or PCMCIA connection.

According to one embodiment, any number of program modules are stored in the drives (e.g., drive 260) and ROM 252, including an operating system (OS) 253, one or more application programs 254, other program modules 255 (e.g., instructions to implement the methods for reducing weighing errors of an item being weighed), and data 256. All or portions of the program modules may also be cached in RAM 251. Any suitable operating system 253 may be employed.

Other versions of the scanner system 100 may have less than all of these components and/or may contain other components. In a preferred configuration, the scanner system 100 comprises a fixed scanner, such as a Magellan® scanner manufactured by Datalogic Scanning, Inc. of Eugene, Oreg. However, the scanner system 100 may also comprise a portable scanner coupled to a scale or other device for weighing an object.

Figure 3:
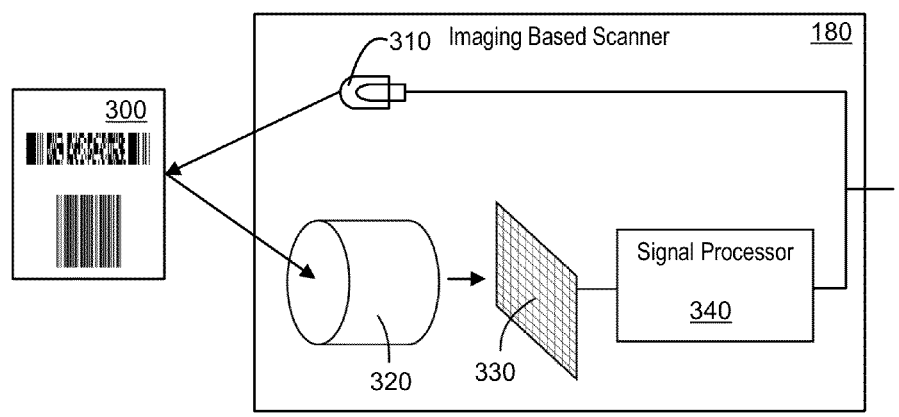
FIG. 3 is a high-level block diagram of an imaging based scanner, according to one embodiment.

FIG. 3 is diagram of an imaging based scanner 180 for forming an image of an item or object 300, according to one embodiment. The object 300 may be any object, but in one preferred use, the object 300 is an item upon which is printed an optical code, such as a bar code. The imaging based scanner 180 comprises an illumination source 310, a lens assembly 320, an imager 330, and a signal processor 340. The imaging based scanner 180 may comprise other components not illustrated or may omit certain components illustrated, such as the illumination source 310. The illumination source 310 may comprise any source of light, such as a row of light emitting diodes (LEDs), flash strobes, or incandescent or fluorescent lamps.

The lens assembly 320 may comprise any number of lenses for focusing light on imager 330. For example, lens assembly 320 may comprise a single optical element or may comprise an array of optical elements with a common axis. The lens assembly 320 may also comprise a zoom lens coupled to the processor 240 to control an amount of optical zoom. The imager 330 forms an electronic image of the object 300. The imager 330 may comprise a wide range of image sensing devices for converting an optical image (or another wave in the electromagnetic spectrum) into an electrical signal. For example, the imager 330 may be a digital camera, such as a charge-coupled device (CCD) camera or complimentary metal-oxide semiconductor (CMOS) camera, both of which form a one-dimensional or two-dimensional array of pixels, which together constitute an electronic representation of the image. Each pixel location stores data indicative of the light intensity at that location of the image. The light intensity data for each pixel may be a color-coded vector (e.g., red-green-blue) or monochrome intensity (e.g., grayscale).

After the imager 330 has been exposed to light reflected by the object 300, data from all the pixels can be sequentially read out in a selectable pattern (which may be row-by-row, column-by-column, or some other pattern). The signal processor 340 conditions the data received from the imager 330 and may generate an output that generally identifies which regions of the image correspond to light areas, and which correspond to dark areas. For example, the signal processor 340 may set the exposure time and thresholding so that the bars or relatively darker regions of the barcode or other target are reported as being dark, and the spaces or relatively lighter regions between the bars or darker regions are reported as being light, according to any of a number of techniques. Either analog or digital signal processing may be utilized in the signal processor 340, which may include, for example, a virtual scan line extraction module, an edge detection module, and one or more decoders (e.g., low level decoders and high level decoders). The virtual scan line extraction module may read or assemble samples or pixels from the imager 330 lying along one or more lines across the image at arbitrary angles or in another desired scan pattern. The resulting ordered set of pixels is sometimes referred to as a "virtual scan line" because it is analogous to a signal generated by reflection of a moving laser beam spot as it scans across the object.

The edge detection module identifies edge transition locations using any number of edge detection techniques. Because edges in images generally have strong intensity contrasts, an increase (or decrease) in intensity from one pixel to the next is indicative of an edge. Accordingly, many edge detection techniques involve calculating a derivative of the intensity changes in pixel values (e.g., intensity changes between a first pixel and an adjacent pixel or more than one adjacent pixel). With regard to a first derivative, an edge transition can occur at a local maxima. With regard to second derivatives, edges occur at zero crossings. The edge detection process disclosed in U.S. Patent Publication No. 2008/0169347, which is hereby incorporated by reference in its entirety, discloses attempting to locate edges by convolving image data with a kernel that approximates a first or second derivative. Additionally, any number of other edge detection techniques may be used, such as subpixel edge detection. Subpixel edge detection may reduce the number of pixels needed for a given image region by interpolating subpixels between integer pixels. Further details of subpixel edge detection can be found in U.S. Pat. No. 5,446,271, which is hereby incorporated by reference in its entirety.

Based on the edge locations, a low level decoder, a high level decoder, or both, may convert the sequence of edges and spacing between the edges into data usable by the host 292. For example, the low level decoder may convert the sequence of edges and spacing between the edges into a set of barcode elements, such as bars and spaces, and the high level decoder may convert the barcode elements into characters, which may be alphanumeric. The signal processor 340 may include control logic to determine whether decoded data should be sent to the host 292 and, if so, when to send the decoded data to the host 292. In addition, the signal processor 340 may further process the output from the low level decoder, the high level decoder, or both, before sending the data to the host 292. For example, the decoded data (e.g., partial sections of a barcode) may be stitched together to form data representing a complete barcode. Additionally, the signal processor 260 may further comprise other modules, such as an amplification module to amplify one or more spatial frequencies, a filtering module, and a timer module. The timer module may be used to indicate when to stop attempting to find characters so that the edge detection and decoder modules are prevented from spending too much time trying to decode data that is not readable or decodable (or at least not easily readable or decodable) or that has already been decoded. While the imager 330 and the signal processor 340 may be contained in the same integrated circuit, the signal processor 340 may be implemented by the processor 240 (FIG. 2).

Figure 4:
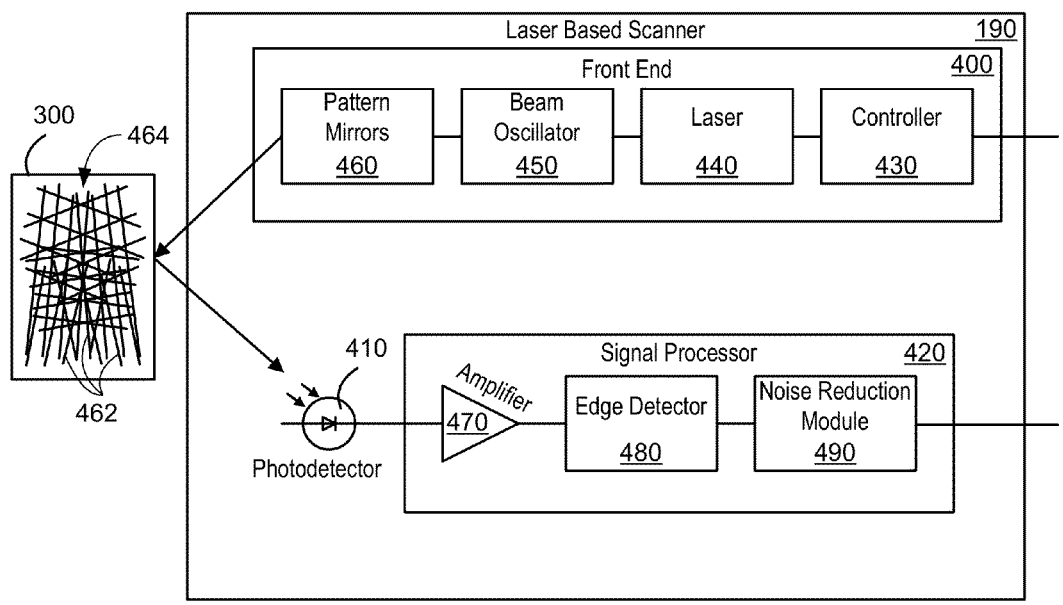
FIG. 4 is a high-level block diagram of a laser based scanner, according to one embodiment.

FIG. 4 is a diagram of a laser based scanner 190, according to one embodiment. The laser based scanner 190 includes a front end 400, a photodetector 410, and a signal processor 420. The front end 400 includes a controller 430, a light source 440, a spinner 450, and one or more pattern mirrors 460. The controller 430 is the primary interface between the scanner system 100 and the components of the front end 400. Thus, the controller 430, among other things, determines whether the light beam generated by the light source 440 is on or off and may also control the brightness of the light beam.

The light source 440 projects a scanning beam out to the object 300 (e.g., that may contain a barcode or other symbol). Preferably, the light source 440 comprises a laser diode. Alternatively, other types of light sources, such as a He—Ne laser, other types of lasers, and/or focused beams of non-laser light may be used instead of a laser diode.

Scanning with the light beam is accomplished using a beam oscillator 450. The beam oscillator 450 may comprise an oscillating mirror driven by an oscillating beam dither driver. Movement of the oscillating mirror causes the scanning light beam to move back and forth, and to thereby trace a line-shaped path over the target barcodes or other target symbols or indicia. However, the beam oscillator 450 may take other forms. For example, the beam oscillator 450 may comprise a rotating polygon with a plurality of mirrored facets.

One or more pattern mirrors 460 may be aligned around the circumference of the beam oscillator 450 for deflecting a set of scan beams outwardly through the lower window 130 or upper window 132. Thus, the pattern mirrors 460 generate respective scan lines 462 across the object 300 in a collective scan pattern, such as scan pattern 464. As the beam oscillator 450 oscillates (or rotates) through its scan arc, the resultant light beam traverses corresponding ones of the pattern mirrors 460, which in turn create corresponding scan lines 462. For example, if the beam oscillator 450 comprises a rotating polygon having four mirrored facets, each facet reflects an incident light beam (e.g., from the laser 440) outwardly along a respective 180° scanned arc as the polygon rotates.

As the scanning beam from the light source 440 sweeps across the object 300 (e.g., with a barcode or other symbol), the scanning beam is reflected by the object 300. Because the bars of the barcode have lower reflectivity than the spaces between the bars, the amount (or intensity) of reflected light will vary depending on whether the projected spot of the scanning beam is incident upon a bar or a space.

The light reflected from the object 300 is collected by appropriate collection optics (which may include lenses and/or collecting mirrors), and directed towards a photodetector 410, such as a photodiode. The reflected beam follows a return path that is generally similar to the forward path (e.g., the reflected beam reflects off of a respective pattern mirror 460 toward the beam oscillator 450), but diverges away from the forward scan path to avoid obstruction of the forward path. The photodetector 410 converts variations in incident light level into a signal that has features (i.e., peaks and valleys) which correspond (in width) to the physical width of relatively darker and relatively lighter portions of the surface of the object 300, which may include a symbol, indicia, or bar code to be read.

The signal output from the photodetector 410 is then processed by the signal processor 420, which may include an amplifier 470, an edge detector 480, and a noise reduction module 490. The amplifier 470 amplifies the signal output from the photodetector 410. Preferably, the gain of the amplifier 470 is adjusted using an automatic gain control (AGC) system, in which an output of either the amplifier itself or another component (e.g., the noise reduction circuit 490) is fed back to control the gain of the amplifier 470.

The edge detector 480 locates the edges of the amplified signal output from the amplifier 470 using any of a variety of techniques. Because edges in images generally have identifiable intensity contrasts, a jump in intensity from one point on the signal to another point on the signal can indicate an edge. Accordingly, the edge detector 480 may calculate a derivative of the signal to identify edges. With regard to a first derivative, an edge transition can occur at a local maxima. With regard to second derivatives, edges occur at zero crossings. Suitable techniques of edge detection are described, for example, in U.S. Pat. No. 5,463,211 (Arends et al.) or U.S. Pat. No. 4,000,397 (Hebert et al.), both of which are hereby incorporated by reference as if set forth fully herein. The noise reduction circuit 490 eliminates or reduces edges in the amplified signal attributed to noise, and operates for example, by discarding or ignoring edges detected whenever the first derivative of the amplified signal is below a threshold value.

The resulting output from the signal processor 420 indicates edge transitions (i.e., a low-to-high or high-to-low transition) corresponding to each edge (i.e., a dark-to-light or light-to-dark transition) of the surface of the object 300, which may contain a barcode, for example. The output format largely depends on the signal processor configuration and may comprise a digital signal, which may be formatted in a run-length encoded or other format. The output signal is provided to the processor 240 (FIG. 2).

The description of FIGS. 1 through 4 have provided an overview of an example data reader and associated concepts. In light of the teachings herein, skilled persons will be aware of equivalent architectures, implementations, and variations for data readers. The description of FIGS. 5-25 will provide various examples of systems and methods for reducing weighing errors associated with partially off-scale items.

Ultrasonic Scale Guard

Figure 5:
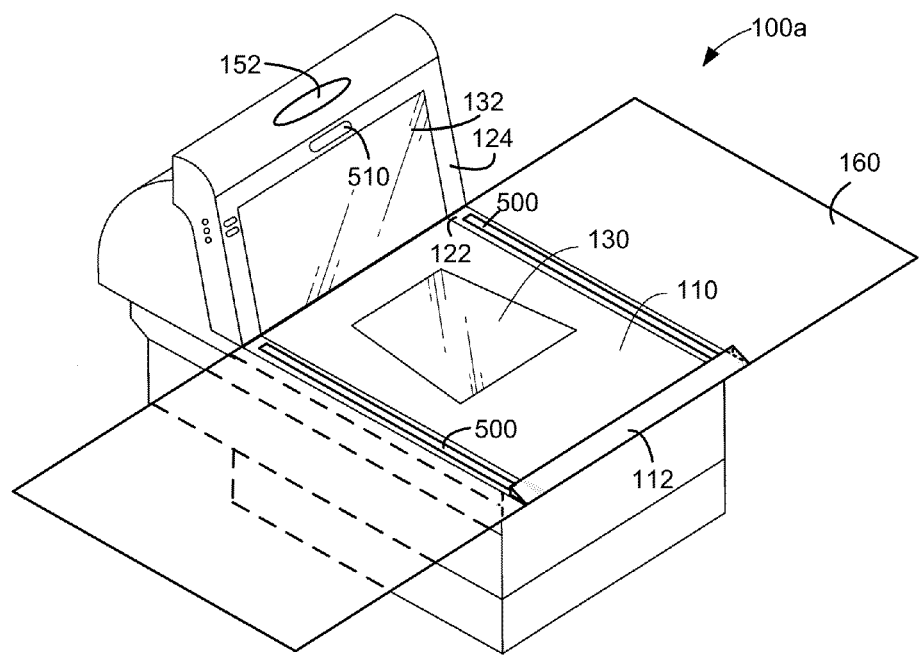
FIG. 5 is a perspective view of a multiplane scanner including an ultrasonic scale-guard system, according to one embodiment.
Figure 6A:
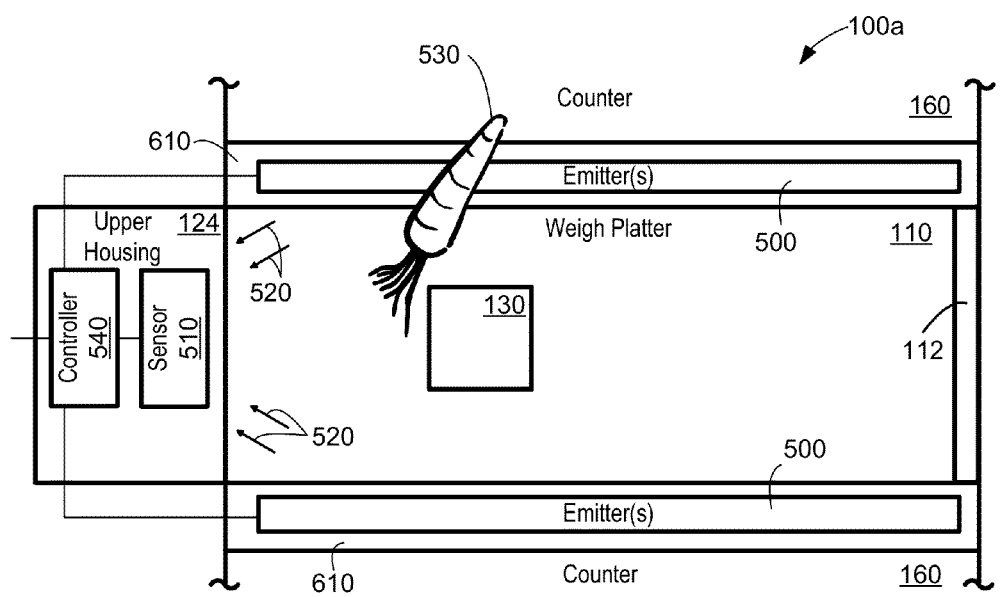
FIGS. 6A and 6B are high-level block diagrams of a multiplane scanner including an ultrasonic scale-guard system, according to various embodiments.
Figure 6B:
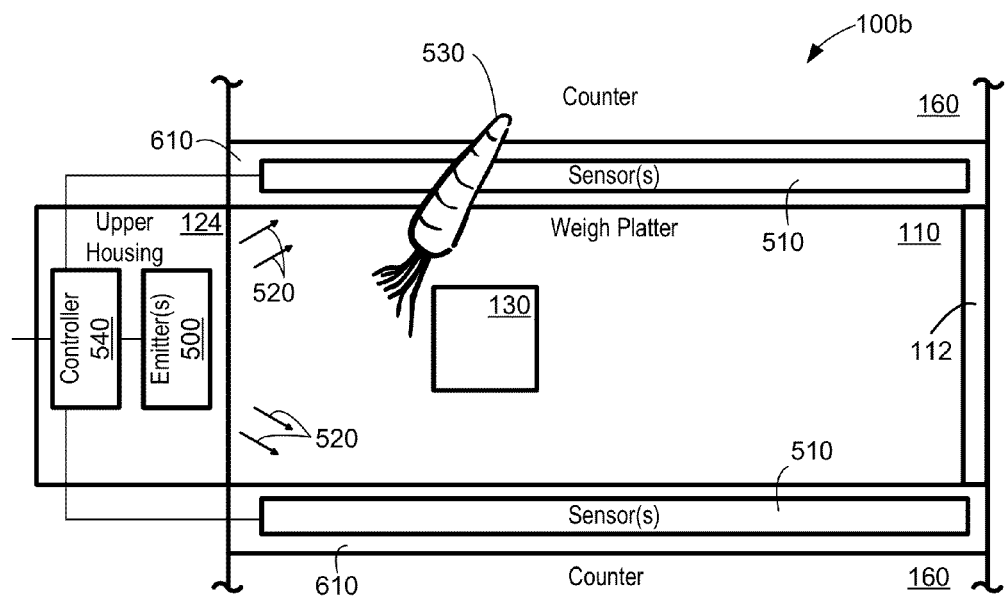

One possible implementation of the scale guard module 210 (FIG. 2) utilizes sound to determine whether an item rests or partially rests on a surface other than the weigh platter 110, such as the counter 160 or a scanner frame 610 (FIGS. 6A and 6B). According to the embodiments illustrated in FIGS. 5 and 6A, the scale guard module 210 comprises an array of emitters or transducers 500 extending along at least one of the opposing lateral edges of the weigh platter 110 for generating non-electromagnetic compression waves 520 and one or more sensors or transducers 510 configured to detect incident compression waves 520. If an item being weighed rests partially on the counter 160 or scanner frame 610 and partially on the weigh platter 110 (e.g., if a carrot 530 extends beyond a peripheral edge of the weigh platter 110) the compression wave(s) 520 incident the sensor(s) 510 will be altered (as will be described in more detail below).

The scanner system 100a illustrated in FIGS. 5, 6A, and 6B is similar to the system 100 illustrated and described with reference to FIGS. 1-4, except the scanner system 100a includes a scale guard module that utilizes sound to determine whether an item being weighed rests or partially rests on a surface other than the weigh platter 110. Thus, the scanner system 100a may include any of the components illustrated and described with reference to FIGS. 1-4, such as the scale module 200, the interlock module 230, the alert module 220, and the data reader.

The emitter(s) 500 may be installed on the weigh platter 110 (as shown in FIG. 5), the frame or lower housing portion 610 of the scanner system 100a (as shown in FIG. 6A), the counter 160, or a combination thereof. The emitter(s) 500 may extend through the surface of the weigh platter 110, the counter 160, or a frame or lower housing portion 610 of the scanner system 100a or may be installed beneath the surface of the weigh platter 110, the counter 160, or a frame or lower housing portion 610 of the scanner system 100a. Additionally, the emitter(s) 500 may be installed proximate a fruit rail edge of the weigh platter 110, an upper-housing edge of the weigh platter 110, or both. Although FIGS. 5 and 6A illustrate the emitter(s) 500 extending along both opposing lateral edges of the weigh platter 110, according to one embodiment the emitter(s) 500 are only included along one of the lateral edges of the weigh platter 110. If the weigh platter 110 comprises another geometric shape, such as a polygon or a circle, the emitter(s) 500 may be installed one or more of the edges of the polygon or around all or a portion of a perimeter of the circle.

According to one embodiment, the emitter(s) 500 comprise a plurality of individual linearly-aligned emitters (which may be spaced apart from one another). However, the emitter(s) 500 may comprise one or more individual emitters, which may be combined into a single component for installation on opposing lateral edges of the weigh platter 110. Additionally, one or more rows of emitters may be provided on each opposing edge of the weigh platter 110. For example, with reference to FIG. 6A, one or more rows of emitters on any side of the emitter(s) 500 may extend along opposing sides of the weigh platter 110.

According to a preferred embodiment, the emitter(s) 500 comprise ultrasonic emitter(s) for generating a frequency greater than an upper limit of human hearing (e.g., above approximately twenty kilohertz). However, the emitter(s) 500 may generate other non-electromagnetic compression waves, such as infrasound waves (e.g., below approximately twenty hertz), acoustic or sound waves within an audible range of humans (e.g., between approximately twenty hertz and twenty kilohertz), or other vibrations transmitted through a solid, liquid, or gas. While the emitter(s) 500 may comprise a piezoelectric film or crystal material, the emitter(s) 500 may comprise other materials, such as ceramics or polymers that create compression waves upon the application of a time-varying electrical signal, such as a high-frequency signal. Additionally, the emitter(s) 500 may comprise ferromagnetic material that changes shape when subjected to a varying magnetic field or a set of spaced apart plates that are attracted to one another upon the application of a potential across the plates.

The sensor(s) 510 generate an electric potential in response to an applied mechanical stress. Thus, the sensor(s) 510 may comprise any of the materials described with reference to the emitter(s) 500. While one sensor 510 may be installed in the upper housing portion 124, the scanner system 100a may be provided with more than one sensor 510 and the sensor(s) 510 may be installed elsewhere, such as in or on the fruit rail 112, the lower housing portion 122, or the counter 160. For example, the emitter(s) 500, the sensor(s) 510, or a combination thereof, may comprise one or more transducers that both generate and detect non-electromagnetic compression waves. If the one or more transducers detect a compression wave reflected by the item, such as the carrot 530, the operator can be notified that the item rests or partially rests on the counter 160.

FIG. 6B illustrates a scanner system 100b according to another embodiment in which the position of the emitter(s) 500 and sensor(s) 510 are reversed. In other words, one or more emitters 500 for generating non-electromagnetic compression waves 520 are supported on the upper housing 124 and an array of sensor(s) 510 extend along at least one of the opposing lateral edges of the weigh platter 110 to detect incident compression waves 520. If an item being weighed, such as a carrot 530, rests partially on the counter 160 and partially on the weigh platter 110, the compression wave(s) 520 incident at the sensor(s) 510 will be altered. While one emitter 500 may be installed in the upper housing portion 124, the scanner system 100b may be provided with more than one emitter 500 and the emitter(s) 500 may be installed elsewhere, such as the fruit rail 112, the lower housing portion 122, or the counter 160. For example, the emitter(s) 500, the sensor(s) 510, or a combination thereof, may comprise one or more transducers that both generate and detect non-electromagnetic compression waves. If the one or more transducers detect a compression wave reflected by the item, such as the carrot 530, the operator can be notified that the item rests or partially rests on the counter 160.

The sensor(s) 510 may be installed on the weigh platter 110, the counter 160, a frame or lower housing portion 610 of the scanner system 100b (as shown in FIG. 6B), or a combination thereof. The sensor(s) 510 may extend through the surface of the weigh platter 110, the counter 160, or a frame or lower housing portion 610 of the scanner system 100b or may be installed beneath the surface of the weigh platter 110, the counter 160, or a frame or lower housing portion 610 of the scanner system 100b. Additionally, the sensor(s) 510 may be installed proximate a fruit-rail edge of the weigh platter 110, an upper-housing edge of the weigh platter 110, or both. Although FIG. 6B illustrates the sensor(s) 510 extending along both opposing lateral edges of the weigh platter 110, according to one embodiment the sensor(s) 510 are only included along one of the lateral edges of the weigh platter 110. If the weigh platter 110 comprises another geometric shape, such as a polygon or a circle, the sensor(s) 510 may be installed one or more of the edges of the polygon or around all or a portion of a perimeter of the circle.

Referring now to FIGS. 6A and 6B, the systems 100a and 100b preferably include a controller 540 communicatively coupled to the emitter(s) 500, the sensor(s) 510, or a combination thereof, and configured to determine whether an item alters the non-electromagnetic compression wave(s) 520 generated by the one or more emitters 500. For example, if the sensor(s) 510 are installed in the upper housing portion 124, the controller 540 monitors the sensor(s) 510 to determine whether the item blocks or interferes with the compression wave(s) 520 generated by the emitter(s) 500. By way of another example, if a set of transducers are disposed along at least one of the opposing lateral edges of the weigh platter 110, the controller 540 may cause the transducers to emit compression waves and monitor the transducers to determine whether the item reflects the compression waves back toward the transducers.

The controller 540 may generate a voltage for creating a potential difference across surfaces of the emitter(s) 500, such as surfaces of a piezoelectric film or crystal. The voltage may comprise an impulse or may comprise a waveform, such as a sinusoid having a predetermined frequency. Additionally, the controller 540 may also be coupled to a transmitter that drives the emitter(s) with a signal so that emitter(s) transmit compression waves 520 and a receiver configured to monitor the sensor(s) for an alteration in amplitude of incident compression waves. Additionally, if the emitter(s) 500 comprise a series of linearly arranged emitters, the controller 540 may control the pulsing of each individual emitter or set of emitters. For example, the controller 540 may be configured to generate a linear, sequential firing pattern, fire sets of emitters simultaneously, or phase the firing of emitters to create a phased array for electronically steering an ultrasound beam. The controller 540 may be incorporated into the processor 240 (FIG. 2), or may comprise a standalone component, such as a commercially available processor or other logic machine capable of executing instructions.

Figure 6C:
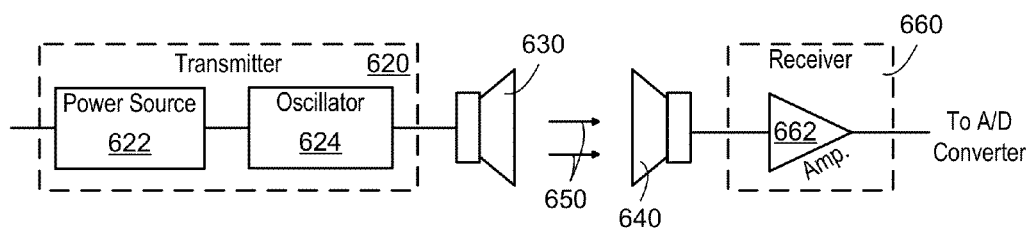
FIG. 6C is a block diagram of an example a transmitter and receiver for an ultrasonic scale-guard system.

FIG. 6C is a block diagram illustrating an example transmitter 620 and an example receiver 660 for detecting whether an item being weighed on a weigh platter is off the weigh platter of a weight scale, which may introduce weighing errors. The transmitter 620 comprises a power source 622 and an oscillator or driver circuit 624. The transmitter 620 is coupled to a set of one or more emitter transducers 630 that emit ultrasound compression waves 650, which are detected by a set of one or more receiving or sensing transducers 640. The transducers 640 are coupled to the receiver 660, which includes an amplifier 662 to amplify the signal generated at transducers 640 by the incident compression waves 650. The receiver 660 may be coupled to an analog to digital convertor, which may be implemented in or by the controller 540 or another circuit, to process the received signals. The piezoelectric transducers 630, 640, or both, may be placed around one or more edges of the weigh platter 110 so that an object blocking one or more transducers, such as produce hanging over an edge of the platter, reduces an output of the receiver 660, which indicates that some corrective action needs to be taken to help prevent weighing errors. For example, an emitter transducer 630, such as a piezo film having a diameter of approximately one inch, may be supported on the upper housing 124 and one or more receiving transducers 640 (each of which may comprise, for example, a piezo film having a diameter of approximately one inch) may be positioned along one or more edges of the weigh platter 110. According to one embodiment, the emitter transducers 630 and receiving transducers 640 may be configured to transmit and receive non-electromagnetic compression waves within the range of approximately 200 kilohertz to approximately 400 kilohertz.

Figure 6D:
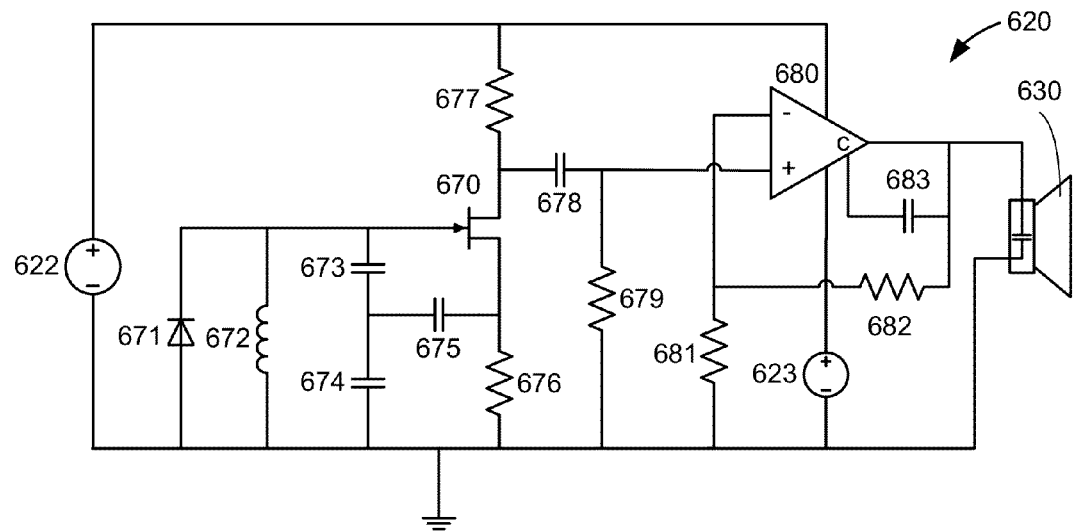
FIG. 6D is a schematic diagram of an example transmitter for an ultrasonic scale-guard system.

FIG. 6D is a schematic diagram of an example transmitter 620. The power source 622 (e.g., 15 volts) and power source 623 (e.g., −15 volts) supply the necessary power to drive the emitter transducer 630. An oscillator is formed from transistor 670, diode 671, inductor 672, capacitors 673-675, resistor 676, and resistor 677. For example, if inductor 672 comprises a 400 μH inductor, capacitor 673 comprises a 1000 pF capacitor, capacitor 674 comprises a 1000 pF capacitor, capacitor 675 comprises a 400 pF capacitor, resistor 676 comprises a 1 kΩ resistor, and resistor 677 comprises a 500Ω resistor, the oscillator would run at approximately 370 kHz. One suitable transistor 670 is the model 2N5484 n-channel amplifier offered by Fairchild Semiconductor Corp., San Jose, Calif., for example. One suitable diode 671 is a model 1N4148 high-speed diode. Capacitor 678 (e.g., a 0.01 μF capacitor) and resistor 679 (e.g., a 1 kΩ resistor) couple the signal (e.g., a sine wave or other waveform) produced by the oscillator to the noninverting input of a power amplifier 680, which drives the piezoelectric transducer 630. The piezoelectric transducer 630 may have a capacitance of 1000 pF, for example. One suitable amplifier 680 is the model LT1210 current feedback amplifier offered by Linear Technology, Milpitas, Calif., for example. A resistor 681 (e.g., a 150Ω resistor) is provided between the negative terminal of power sources 622 and 623 and the inverting input of the amplifier 680. A feedback resistor 682 (e.g., a 20 kΩ resistor) is provided between the inverting input of the amplifier 680 and the output of the amplifier 680. A capacitor 683 (e.g., a 0.01 μF capacitor) may be provided between the output of the amplifier 680 and the shutdown input of the amplifier 680.

Figure 6E:
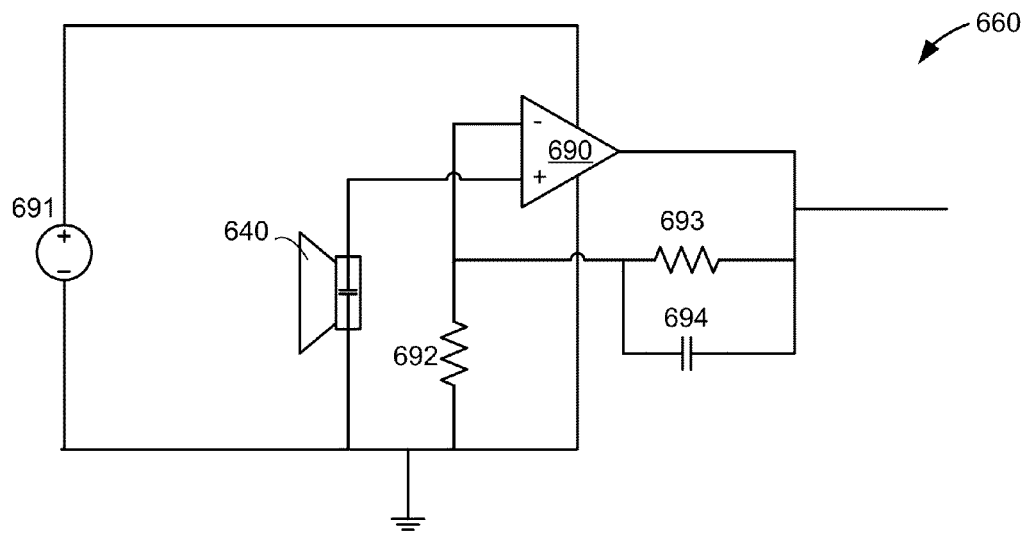
FIG. 6E is a schematic diagram of an example receiver for an ultrasonic scale-guard system.

FIG. 6E is a block diagram of an example receiver 660, which includes an amplifier 690. Non-electromagnetic compression waves that are incident the piezoelectric receiving transducer 640 generate a signal which is amplified by the amplifier 690. The amplified signal may then be sent to an analog to digital convertor for processing. Based on a change in the received signal the scale operator will be sent an alert if a corrective action is required. The piezoelectric transducer 640, which may have a capacitance of 100 pF, is coupled to the noninverting input of the amplifier 690. One suitable amplifier 690 is the model LT1037 operational amplifier offered by Linear Technology, Milpitas, Calif., for example. A power source 691 (e.g., 5 volts) supply the necessary power to drive the amplifier 690. A resistor 692 (e.g., a 150Ω resistor) is provided between the negative terminal of power source 691 and the inverting input of the amplifier 690. A resistor 693 (e.g., a 100 kΩ resistor) and a capacitor 694 (e.g., a 0.001 μF capacitor) are connected in parallel between the inverting input of the amplifier 690 and the output of the amplifier 690.

Figure 7:
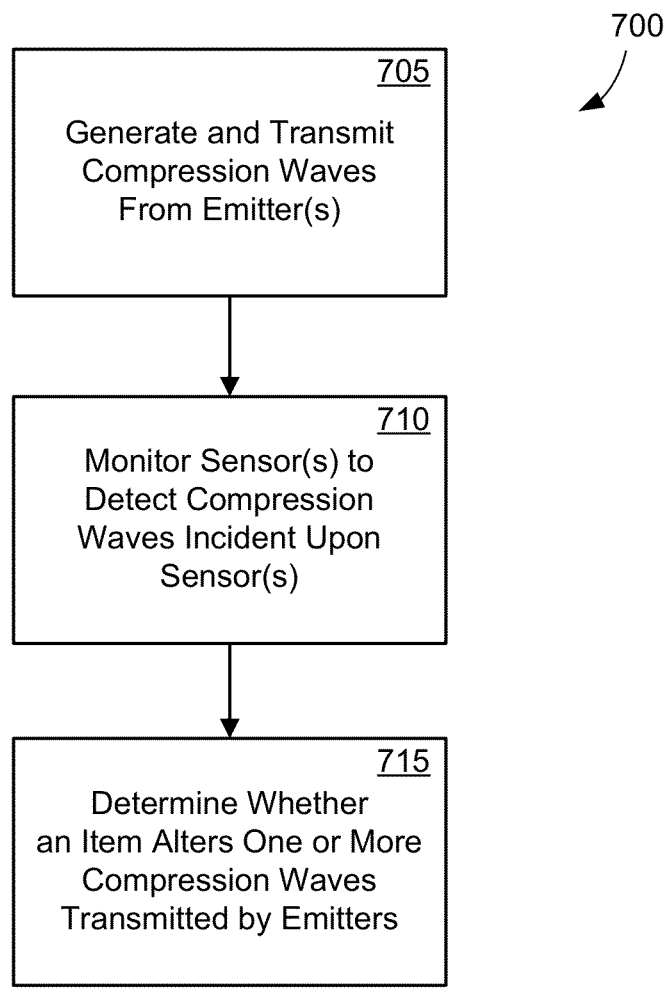
FIG. 7 is a high-level flowchart illustrating a method for reducing weighing errors associated with data readers, according to one embodiment.

FIG. 7 is a high-level flowchart illustrating a method 700 for reducing weighing errors associated with data readers, according to one embodiment. Initially, one or more emitter transducers (e.g., emitter(s) 500), one or more receiving transducer (e.g., sensor(s) 510), or a combination thereof, are installed in the scanner system 100a and communicatively coupled to one or more of a transmitter (e.g., transmitter 620), receiver (e.g., receiver 660), and a controller (e.g., controller 540). For example, as shown in FIGS. 5 and 6A, an array of emitter(s) 500 may be positioned one or more of the edges of the weigh platter 110 and one or more sensor(s) 510 may be supported on the upper housing 124. The user or operator can then operate the scanner system in a conventional manner. For example, the user can position items proximate the lower window 130, the upper window 132, or both, in an attempt to read encoded symbols thereon. In addition, the user can weigh items by placing the items on the weigh platter 110.

The method 700 includes the steps of generating and transmitting one or more non-electromagnetic compression waves from one or more emitters at step 705. For example, a transmitter (e.g., transmitter 620) may be coupled to and drive the one or more emitter transducers so that the transducers transmit non-electromagnetic compression waves, which propagate toward one or more sensors. The emitter(s) may extend along one or more lateral edges of the weigh platter 110 (FIG. 6A), be disposed on the upper housing 124 (FIG. 6B), or be suitably positioned elsewhere on the scanner system. After being generated, the compression waves travel to one or more sensors. At step 710, compression wave(s) incident upon the one or more sensors are detected. For example, a receiver (e.g., receiver 660) may be coupled to the one or more sensors to amplify the signal generated at the sensor(s) by the incident compression waves. The receiver may also be coupled to an analog to digital convertor so that the received signals can be processed.

At step 715, it is determined whether an item alters one or more of the non-electromagnetic compression waves generated by the emitter(s). For example, as non-electromagnetic compression waves impact the sensor (e.g., a piezoelectric film or crystal), the sensor 510 produces a voltage that is proportional to the intensity or amplitude of the incident wave. Thus, the receiver (e.g., receiver 660), the controller (e.g., controller 540), or both, may monitor the voltage across the sensor(s) (e.g., across surfaces of the piezoelectric film or crystal) to determine whether the amplitude of incident waves change over time or from a baseline. The method 700 may continuously or periodically monitor the voltage across the sensor(s) for amplitude changes (e.g., changes that exceed a threshold) or may measure the voltage across the sensor(s) in response to a weigh request and compare the measured voltage to a baseline voltage. If an item, such as the carrot 530, overlaps one or more emitter(s) (FIG. 6A) or sensor(s) (FIG. 6B), the amplitude of incident waves at the sensor(s) will be reduced.

According to one embodiment, the method 700 periodically measures the voltage across the sensor(s) to update the baseline amplitude of incident waves and stores the updated baseline amplitude in a memory (e.g., memory 250, drive 260, or both). Thus, after receiving a weigh request, the voltage across the sensor(s) may be measured and compared to the stored baseline amplitude to determine whether an item alters one or more of the waves generated by the emitter(s). Periodically updating the baseline amplitude may help reduce the effect of contaminants covering the emitter(s), the sensor (s), or both.

The method 700 may determine whether an item alters waves generated by the emitter(s) in other ways. For example, according to another embodiment, one or more transducers configured to transmit and receive non-electromagnetic compression waves extend along one or more lateral edges of the weigh platter 110 are disposed on the upper housing 124 proximate one or more lateral edges of the weigh platter 110, or are positioned elsewhere on the scanner system. A transmitter coupled to the transducers drive the transducers with a signal so that the transducers transmit non-electromagnetic compression waves from the top surface of the weigh platter. A receiver, controller, or both, are also coupled to the transducers and monitor the transducers to detect compression waves reflected by an item back toward the top surface of the weigh platter to determine whether an item overhangs an edge of the weigh platter (i.e., rests partially on the weigh platter and partially on the checkout counter or other fixed object such as a frame of the scanner). The receiver, controller, or both, monitor incident waves reflected by an item within a certain distance from the transducers (e.g., based on the time it took the wave to propagate from the transducer to the item and back to the transducer) to detect items that may affect the measured weight of the item. In other words, the receiver, the controller, or both, may look for waves reflected by an item positioned proximate the transducers (which is probative of an item overhanging the weigh platter) and may ignore incident waves reflected from the ceiling or the user's hand passing over the sensor(s).

Upon detecting an alteration of one or more of the waves, the method 700 may notify the user that the item may not be accurately weighed (i.e., an item extends between the weigh platter and another surface, such as the counter or frame of the scanner) via the alert module 220 (FIG. 2). Additionally or alternatively, the method 700 may halt the weighing operation until item is properly positioned (e.g., the measured amplitude returns to within operational tolerances) via the interlock module 230.

Radiofrequency Scale Guard

Figure 8:
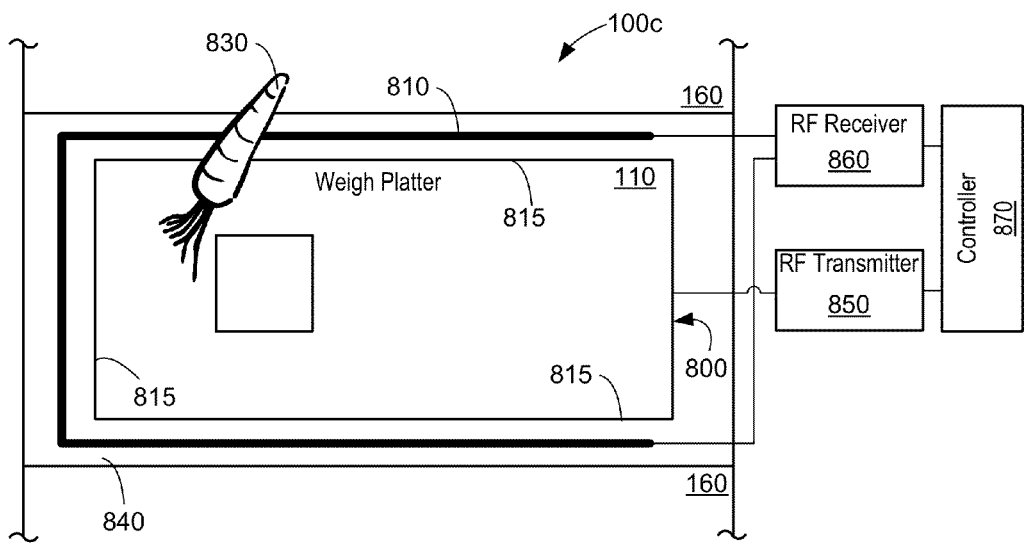
FIG. 8 a high-level block diagram of a multiplane scanner including a radiofrequency scale-guard system, according to one embodiment.

FIGS. 8-10 illustrate another possible implementation of the scale guard module 210 (of FIG. 2) utilizes radio waves to determine whether an item rests or partially rests on a surface other than the weigh platter 110, such as the counter 160 or a scanner frame 840. According to the embodiment illustrated in FIGS. 8, 9, and 10, the scale guard module 210 comprises a weigh platter 110 configured to form a radiating antenna 800 and a receiving antenna 810, such as a loop of wire, at least partially surrounding the weigh platter 110 for receiving a radiofrequency (RF) signal 820 from the radiating antenna 800. If an item being weighed, such as a carrot 830, rests partially on the weigh platter 110 and partially on another surface (e.g., the counter 160), the RF signal(s) 820 incident at the receiving antenna 810 will be altered.

The scanner system 100c illustrated in FIG. 8 is similar to the system 100 illustrated and described with reference to FIGS. 1-4, except the scanner system 100c includes a scale guard module that utilizes radio waves to determine whether an item being weighed rests or partially rests on a surface other than the weigh platter 110. Thus, the scanner system 100c may include any of the components illustrated and described with reference to FIGS. 1-4, such as the scale module 200, the interlock module 230, the alert module 220, and the data reader.

According to one embodiment, the radiating antenna 800 comprises the weigh platter 110. For example, the weigh platter 110 may be electrically isolated from other portions of the scanner system 100c, such as a scanner frame 840 or counter 160, so that the weigh platter 110 forms a transducer capable of transmitting or receiving electromagnetic waves. The radiating antenna 800 may also take other forms. For example, the antenna 800 may comprise a length of wire embedded into the weigh platter 110 along all or a portion of the perimeter or peripheral edge 815 of the weigh platter 110. Additionally, an array of antennas may be supported by the weigh platter 110.

According to a preferred embodiment, the antenna 800 is configured to transmit (or receive) electromagnetic waves within the range of approximately three megahertz to approximately thirty megahertz. However, the antenna 800 may be configured to transmit (or receive) electromagnetic waves within the range of approximately three hertz to approximately three-hundred gigahertz. The antenna 800 may be omnidirectional or configured to direct RF signal(s) 820 toward the receiving antenna 810.

Figure 9A:
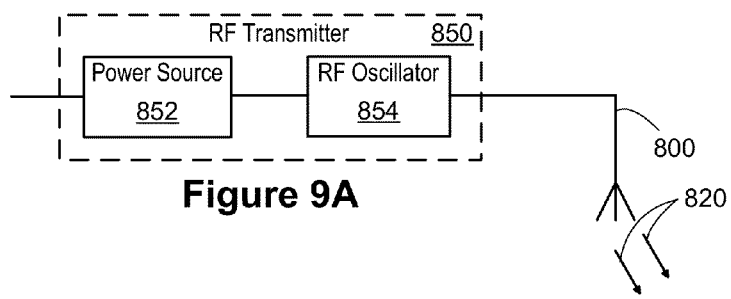
FIG. 9A is a block diagram of an example radiofrequency transmitter.

An RF transmitter 850 is provided to drive the radiating antenna 800 with a signal that causes the antenna 800 to radiate one or more RF signals 820. FIG. 9A is a block diagram illustrating an RF transmitter 850, according to one embodiment. The RF transmitter 850 comprises a power source 852 and RF oscillator 854. The power source 852 supplies the necessary power to drive the antenna 800. Because the RF signal(s) 820 may need only travel a short distance from the radiating antenna 800 and receiving antenna 810, the power requirements for the RF transmitter 850 are relatively modest. For example, the distance between the radiating antenna 800 and receiving antenna 810 may be approximately ¼ inch and the RF transmitter 850 may have a power level of approximately 100 μW. The RF oscillator 854 generates a signal having a preselected frequency to drive the antenna 800. For example, the signal may have a frequency within the range of approximately three megahertz to approximately thirty megahertz. The frequency used to drive the antenna 800 may be selected based on the length of the antenna (e.g., the length of the antenna is proportional to the drive frequency) and may be tunable in the field. To maximize the power transfer from the RF transmitter 850 to the antenna 800, the RF transmitter 850 may also include an impedance matching circuit to match the impedance of the RF transmitter 850 and the antenna 800.

Figure 9B:
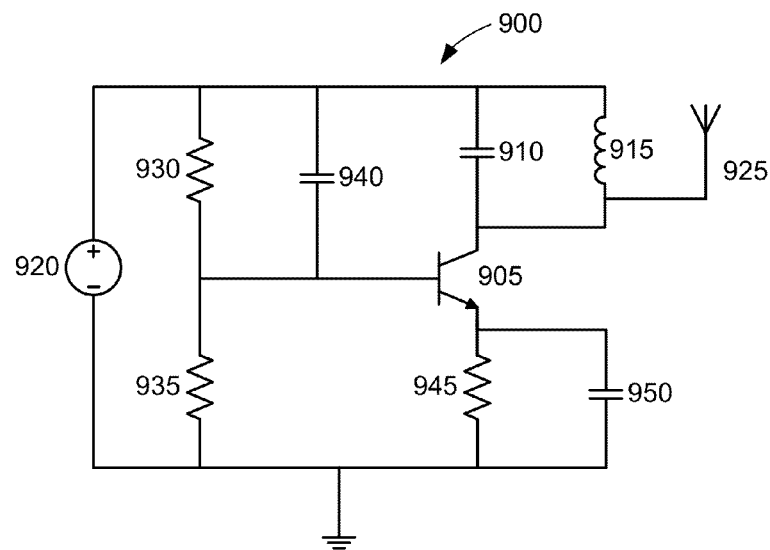
FIG. 9B is a schematic diagram of an example radiofrequency transmitter.

FIG. 9B is a schematic diagram of a radiofrequency transmitter 900, according to one embodiment. The RF transmitter 900 comprises a transistor 905 (the gain component) and a resonant tank circuit (formed by capacitor 910 and inductor 915) connected to the collector of transistor 905. One suitable transistor 905 is the model 2N3904 NPN amplifier offered by Fairchild Semiconductor Corp., San Jose, Calif., for example. The resonant tank circuit can be tuned to any number of frequencies based on Equation 1, where $F_{osc}$ is the oscillating frequency, $C_2$ corresponds to capacitor 910 and $L_1$ corresponds to inductor 915.

$$F_{OSC} = \frac{1}{6.28 * \sqrt{C_2 * L_1}} \quad \text{Equation 1}$$

For example, if capacitor 910 is a 100 pF capacitor and inductor 915 is a 2.5 μH inductor, the resonant frequency is approximately 10 Mhz. The antenna 925 is connected to the output of the RF transmitter 900 at an end of inductor 915 opposite the power source 920 (e.g., a five volt DC power source). Antenna 925 may comprise the weigh platter 110 or an appropriate length wire surrounding the weigh platter 110. Resistor 930 (e.g., a 10 kΩ resistor) and capacitor 940 (a 0.01 μF capacitor) may be connected in parallel between the base of transistor 905 and the positive side of the power source 920. Resistor 935 (e.g., a 1 kΩ resistor) may be connected between the base of transistor 905 and the negative side of the power source 920. Resistor 945 (e.g., a 1 kΩ resistor) and capacitor 950 (a 22 pF capacitor) may be connected in parallel between the emitter of transistor 905 and the negative side of the power source 920.

Referring again to FIGS. 8 and 10A, the receiving antenna 810 comprises a loop of wire at least partially surrounding the weigh platter 110 to receive the RF signal 820 from the radiating antenna 800 according to one embodiment. For example, as shown in FIG. 8, the receiving antenna 810 surrounds three edges 815 of a top surface of the weigh platter 110. The receiving antenna 810 may take other forms. For example, the antenna 810 may comprise a length of wire embedded into the scanner frame 840 or the counter 160. Additionally, an array of antennas may be supported by the scanner system 100, such as by the scanner frame 840 or the counter 160, and configured to receiving the RF signal 820 from the radiating antenna 800.

The receiving antenna 810 is configured to receive (or transmit) the RF signal(s) 820 from the radiating antenna 800, which is, according to a preferred embodiment, within the range of approximately three megahertz to approximately thirty megahertz. However, the antenna 810 may be configured to receive (or transmit) electromagnetic waves within the range of approximately three hertz to approximately three-hundred gigahertz.

Figure 10A:
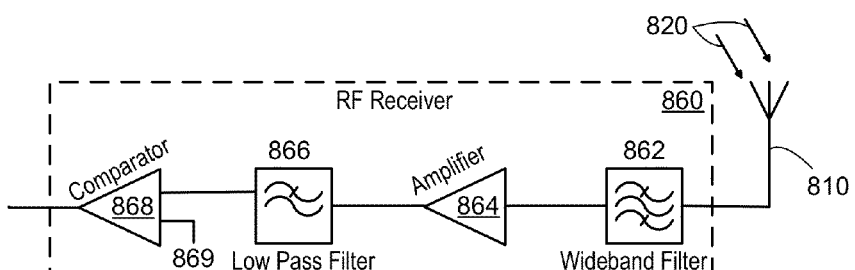
FIG. 10A is a block diagram of an example radiofrequency receiver.

An RF receiver 860 is provided to monitor the receiving antenna 810 for the RF signal(s) 820, and in particular, a change in the RF signal(s) 820. FIG. 10A is a block diagram of an RF receiver 860, according to one embodiment. The RF receiver 860 comprises a wideband filter 862, an amplifier 864, a low pass filter 866, and a comparator 868. The antenna 810 is coupled to the amplifier 864 via the wideband filter 862. The wideband filter 862 is configured to eliminate or filter out unwanted low and high frequency signals which are outside of a preselected range. An impedance matching circuit may be provided between the antenna 810 and the filter 862 for matching the impedances of the RF receiver 860 and the antenna 810 in an attempt to maximize the power transfer from the antenna 800 to the RF receiver 860. According to a preferred embodiment, the amplifier 864 provides a gain of approximately seven dB at the center frequency of approximately ten megahertz. However, the amplifier 864 may provide a higher or lower gain.

The output from the amplifier 864 may run through the low pass filter 866 to remove any high frequency noise and then be fed into the comparator 868 along with a predetermined threshold reference voltage 869. The comparator 868 then monitors the output from the low pass filter 866 for a change in voltage caused by a change in the RF signal(s) 820 indicative of an item extending between the weigh platter 110 and another surface. For example, if an item, such as the carrot 830, extends between the weigh platter 110 and another surface, the item changes the coupling of the RF signal 820 from the radiating antenna 800 to the receiving antenna 810. The RF coupling change may result in a decrease in voltage at the output of the low pass filter 866. If the output voltage of the low pass filter 866 drops below the threshold voltage 869, the comparator 868 will output a low logic signal indicating that an item extends between the weigh platter 110 and another surface. If the item is properly positioned on the weigh platter 110, the output voltage of the low pass filter 866 may rise above the threshold voltage 869 and cause the comparator 868 to output a high logic signal.

Alternations in the RF signal 820 caused by the item may be detected in other ways. For example, the RF coupling change caused by the item may result in an increase in voltage at the output of the low pass filter 866 and cause the comparator 868 to output a high logical signal indicative of a potential weighing error. By way of another example, the item may alter the RF signal 820 in other ways, such as introducing a phase shift into the signal or altering a frequency of the signal. The RF receiver 860 may be implemented in hardware, software, firmware, or any combination thereof. Thus, the RF signal(s) 820 received by the antenna 810 may be sampled and one or more of the components that comprise the RF receiver 860 may be implemented in software, for example.

Figure 10B:
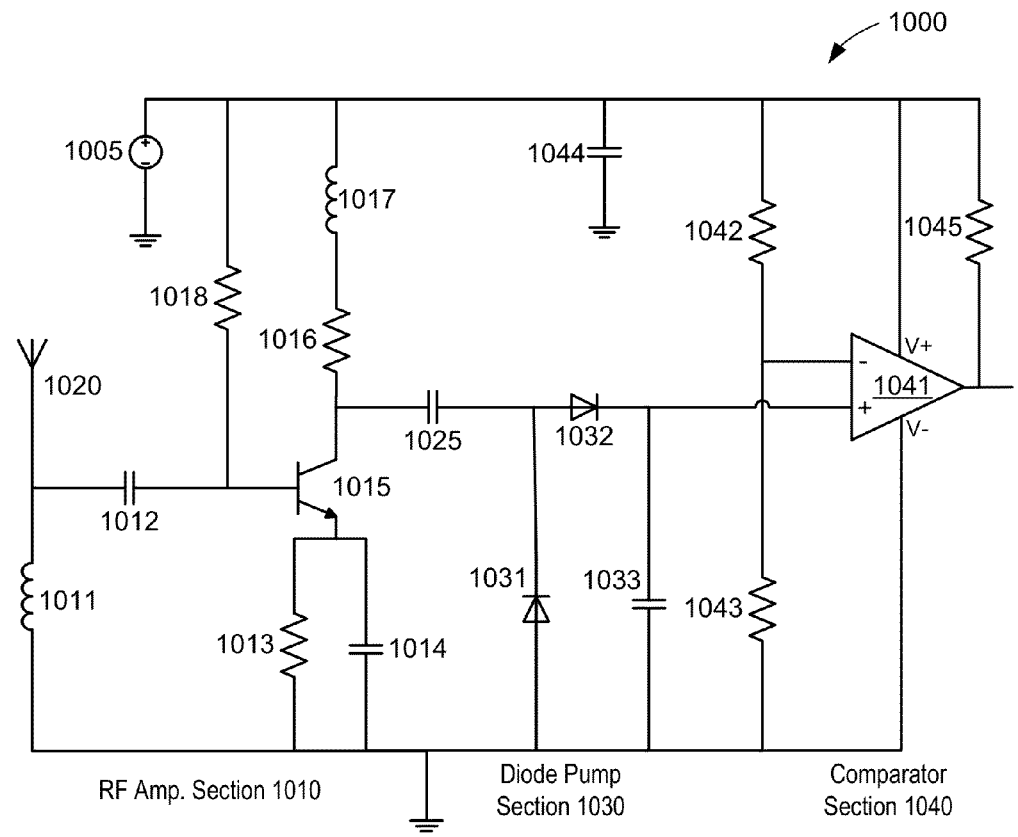
FIG. 10B is a schematic diagram of an example radiofrequency receiver.

FIG. 10B is a schematic diagram of a radiofrequency receiver 1000, according to one embodiment. The RF receiver 1000 may comprise an RF amplifier section 1010, a diode pump section 1030, and a comparator section 1040. The RF amplifier section 1010 is a tuned amplifier where inductor 1011 and capacitor 1012 set the bandwidth of the amplifier section 1010. According to one embodiment, the inductor 1011 comprises a 10 μH inductor and capacitor 1012 comprises a 47 pF capacitor, so the amplifier section 1010 has a center frequency of approximately 10 MHz and a passband of approximately 1 Mhz. Antenna 1020 (e.g., the weigh platter 110 or the receiving antenna 810) is connected to the junction of inductor 1011 and capacitor 1012. The other end of capacitor 1012 is connected to the base of transistor 1015. One suitable transistor 1015 is the model 2N2222A NPN transistor offered by Philips Semiconductor, Sunnyvale, Calif., for example. Resistor 1013 (e.g., a 1.6 kΩ resistor) and capacitor 1014 (e.g., a 100 pF capacitor) are connected in parallel between the emitter of transistor 1015 and the negative side of power source 1005 (e.g., a twelve volt DC source). Resistor 1016 (e.g., a 1.6 kΩ resistor) and inductor 1017 (e.g., a 8 μH inductor) are connected in series between the collector of transistor 1015 and the positive side of the power source 1005. A resistor 1018 (e.g., a 100 kΩ resistor) is connected between the base of transistor 1015 and the positive side of the power source 1005.

The output of the RF amplifier section 1010 is coupled via a capacitor 1025 (e.g., a 1 nF capacitor) to the diode pump section 1030, which rectifies the RF signal received from the antenna 1020 and amplified by the RF amplifier section 1010. The DC output from the diode pump section 1030 is proportional to the amplitude of the RF signal received by the antenna 1020. The diode pump section 1030 comprises diodes 1031 and 1032 and capacitor 1033 (e.g., a 1 nF capacitor). The anode of diode 1031 is coupled to the negative side of the power source 1005 and the cathode is coupled to the capacitor 1025. The anode of diode 1032 is coupled to the capacitor 1025 and the cathode of the diode 1031 and the cathode of diode 1032 is coupled to the non-inverting input of comparator 1041. The capacitor 1033 is connected between the cathode of the diode 1032 and the negative side of the power source 1005. Suitable diodes 1031 and 1032 are the model D1N4148 diode offered by Fairchild Semiconductor Corp., San Jose, Calif., for example.

The DC output from the diode pump section 1030 is coupled to the non-inverting input of comparator 1041. If the DC output from the diode pump section 1030 falls below the reference voltage level set by resistor 1042 and resistor 1043, the output from the comparator 1041 transitions from high to low indicating that an item extends between the weigh platter 110 and another surface (e.g., the item has changed the amount of coupled RF to the antenna 1020). Thus, if the resistor 1042 is a 11.8 kΩ resistor and the resistor 1043 is a 200Ω resistor, the output from the comparator 1041 transitions from high to low if the DC output from the diode pump section 1030 falls below approximately 0.2 volts. As shown in FIG. 10B, the resistor 1042 is connected between the positive side of the power source 1005 and the inverting input of comparator 1041 and resistor 1043 is connected between the negative side of the power source 1005 and the inverting input of comparator 1041. One suitable comparator is the model LMC7211 comparator offered by National Semiconductor Corp., Arlington, Tex., for example. The RF receiver 1000 may include additional components, such as a capacitor 1044 (e.g., a 22 μF capacitor) connected between the positive and negative sides of the power source 1005 and a resistor 1045

(e.g., a 20 kΩ resistor) connected between the positive side of the power source 1005 and the output of the comparator 1041.

The RF transmitter (e.g., RF transmitters 850 or 900), the RF receiver (e.g., RF receiver 860 or 1000), or both, may be communicatively coupled to a controller 870, which is configured to determine whether an item alters the RF signal 820. For example, the controller 870 may monitor the output of the comparator 868 for a change from logic high to logic low (or vice-versa). The controller 870 may also be configured to cause the RF transmitter 850 to start transmitting the RF signal 820 and cause the RF receiver 860 to start monitoring the antenna 810 for the RF signal 820 and alterations thereof. The controller 870 may be incorporated into the processor 240, or may comprise a standalone component, such as a commercially available processor or other logic machine capable of executing instructions.

The radiofrequency scale guard module may be implemented in other ways. For example, the RF transmitter 850 and the RF receiver 860 may comprise a transceiver and include a switch for coupling the transceiver to the radiating antenna 800 or the receiving antenna 810. Additionally, the locations of the radiating antenna 800 and receiving antenna 810 may be reversed. For example, the weigh platter 110 may form the receiving antenna 810 and the loop of wire may comprise the radiating antenna 800. Further, one or more radiating antennas 800, one or more receiving antennas 810, or any combination thereof, may be located in various locations, such as the upper housing portion 124, the fruit rail 112, the lower housing portion 122, the scanner frame 840, the counter 160, or elsewhere on the system scanner 100.

Figure 11:
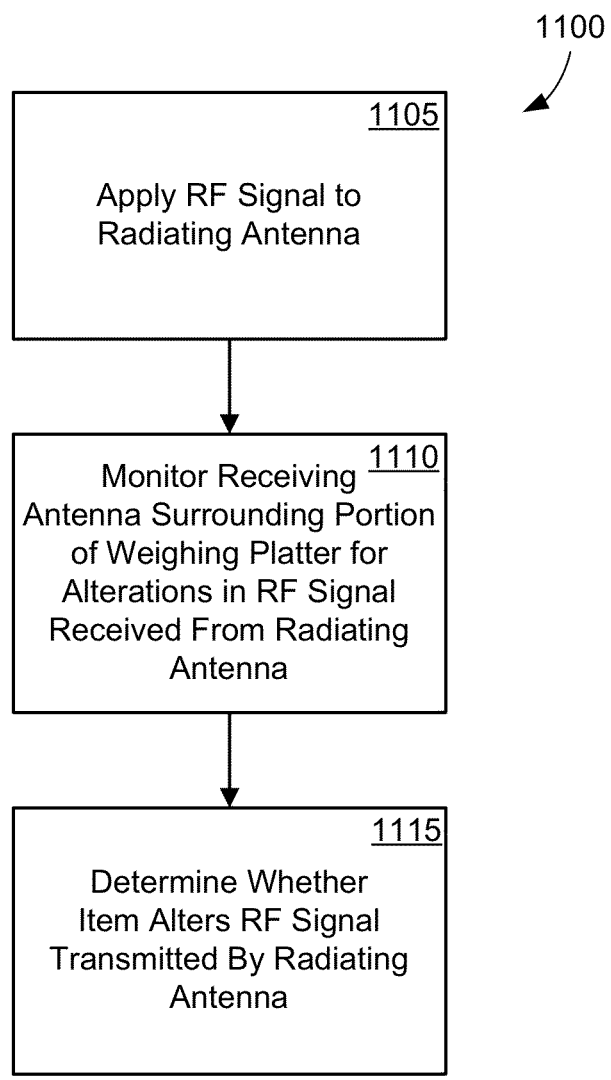
FIG. 11 is a high-level flowchart illustrating a method for reducing weighing errors associated with data readers, according to another embodiment.

FIG. 11 is a high-level flowchart illustrating a method 1100 for reducing weighing errors associated with data readers, according to one embodiment. Initially, one or more radiating antennas 800, one or more receiving antennas 810, or a combination thereof, are installed on the scanner system 100 and connected to respective components, such as the RF transmitter 850, the RF receiver 860, or the controller 870. Preferably, the weigh platter 110 is configured to form the radiating antenna 800 (e.g., by electrically isolating the weigh platter 110 from other portions of the scanner system 100) and a loop of wire is positioned to at least partially surround the weigh platter 110 to form the receiving antenna 810 (see, e.g., FIG. 8). The user can then operate the scanner system 100 in a conventional manner. For example, the user can position items proximate the lower window 130, the upper window 132, or both, in an attempt to read encoded symbols thereon. In addition, the user can weigh items by placing the items on the weigh platter 110.

At step 1105, the method 1100 generates and applies an RF signal to a set of radiating antennas 800 (where the set may comprise one or more antennas), such as the weigh platter 110. At step 1110, the method 1100 monitors a set of receiving antennas 810 (where the set may comprise one or more antennas), such as a loop of wire partially surrounding the weigh platter 110, for alterations of the RF signal(s) 820 received by the set of antennas 810. In other words, the RF receiver is looking for a change in the coupling (e.g., transfer of energy) of the RF signal (e.g., a change in the amplitude of the signal received). For example, the RF transmitter 850 may be configured to drive the set of radiating antennas 800 with a signal that causes the set of antennas 800 to radiate the RF signal(s) 820, and the RF receiver 860 may be configured to filter, amplify, and compare the RF signal(s) 820 received by the set of receiving antennas 810 to a predetermined threshold.

According to one embodiment, the method 1100 periodically updates the threshold (e.g., daily). For example, the method 100 may periodically measure or monitor the strength or amplitude of the RF signal when an item does not rest partially on the weigh platter and partially on the checkout counter or other fixed object to update the threshold. The updated threshold may be used to update the threshold reference voltage 869 or may stored in a memory (e.g., memory 250, drive 260, or both). Periodically updating the threshold may help reduce environment effects, such as humidity, on the radiofrequency scale guard module.

At step 1115, the method 1100 determines whether an item alters the RF signal(s) 820 transmitted by the set of radiating antennas 800. For example, if an item, such as the carrot 830, overlaps the set of radiating antennas 800 and the set of receiving antennas 810, the coupling of the RF signal between the antennas 800 and 810 will be altered. Thus, the controller 870 may monitor the output of the comparator 868 for logic level changes (e.g., low to high, or high to low) indicating that the received RF signal(s) 820 have been altered by the item in comparison to a reference signal.

Upon detecting an alteration of the RF signal(s) 820 transmitted by the set of radiating antennas 800, the method 1100 preferably notifies the user that an item may not be accurately weighed (i.e., an extends between the weigh platter 110 and another surface, such as the counter or frame of the scanner) via the alert module 220 (FIG. 2). Additionally or alternatively, the method 1100 may halt the weighing operation until item is properly positioned (e.g., received RF signal returns to within operational tolerances) via the interlock module 230.

Light Beam Based Scale Guard

Figure 12A:
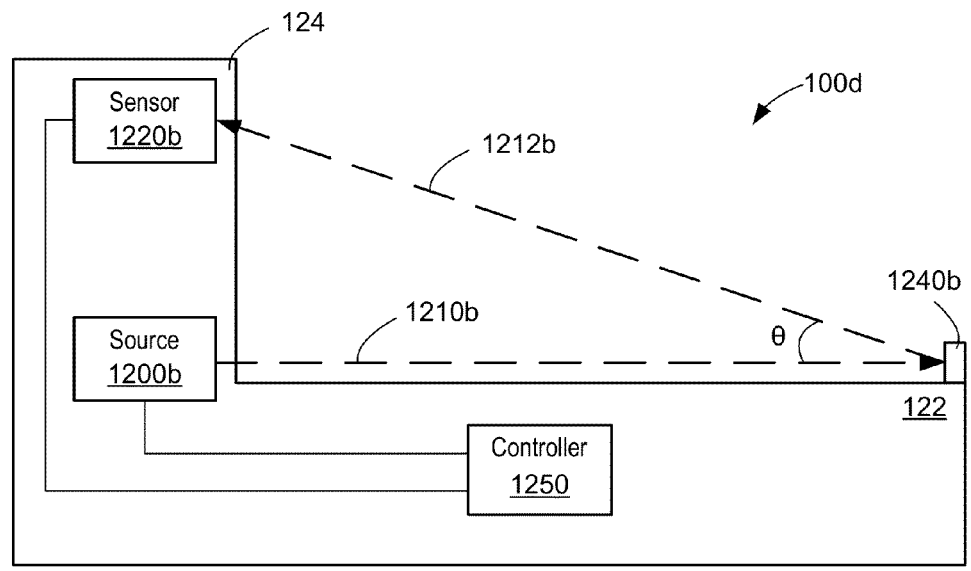
FIGS. 12A, 12B, 12C, and 13 are high-level block diagrams of a multiplane scanner including a light beam scale-guard system, according to one embodiment.
Figure 13:
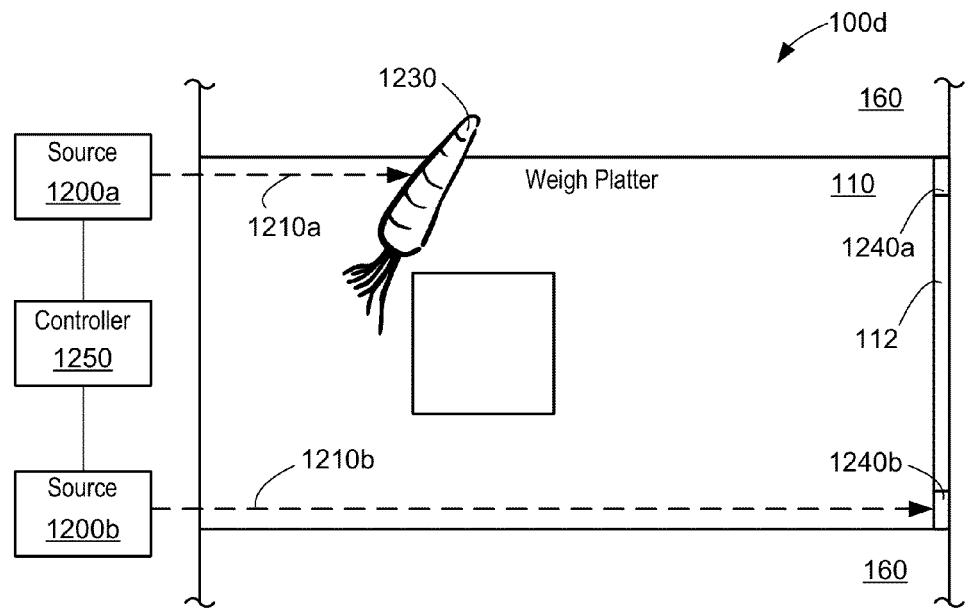

FIGS. 12A-13 illustrate another possible implementation of the scale guard module 210 (of FIG. 2) utilizes light beams along opposing edges of the weigh platter 110 to determine whether an item rests or partially rests on a surface other than the weigh platter 110, such as the counter 160 or a scanner frame. FIGS. 12A and 13 illustrate the scale guard module 210 comprising one or more sources (e.g., sources 1200a and 1200b) configured to transmit two substantially parallel light beams 1210a and 1210b along opposing lateral edges of the weigh platter 110 and one or more sensors (e.g., sensors 1220a and 1220b) configured to detect reflected light beams 1212a and 1212b. If an item being weighed, such as a carrot 1230, rests partially on the counter 160 and partially on the weigh platter 110, any combination of the light beam 1210a, the light beam 1210b, the reflected light beam 1212a, or the reflected light beam 1212b will be blocked or partially blocked.

The scanner system 100d illustrated in FIGS. 12A and 13 is similar to the system 100 illustrated and described with reference to FIGS. 1-4, except the scanner system 100d includes a scale guard module that utilizes light beams along opposing edges of the weigh platter 110 to determine whether an item being weighed rests or partially rests on a surface other than the weigh platter 110. Thus, the scanner system 100d may include any of the components illustrated and described with reference to FIGS. 1-4, such as the scale module 200, the interlock module 230, the alert module 220, and the data reader.

Preferably, two sources 1200a and 1200b are provided for transmitting respective light beams 1210a and 1210b along opposing edges of the weigh platter 110. While the sources 1200a and 1200b may be supported by the upper housing 124, the sources 1200a and 1200b may be installed elsewhere, such as the lower housing 122 or the counter 160. According to one embodiment, the sources 1200a and 1200b are not mounted on the weigh platter 110. Additionally, one or more mirrors may be provided (e.g., in the upper housing 124) to direct light beams 1210a and 1210b along opposing edges of the weigh platter 110. Thus the sources 1200a and 1200b need not be located in-line with the light beams 1210a and 1210b and instead may be offset (e.g., laterally or vertically) from the light beams 1210a and 1210b if one or more redirecting mirrors are used. Further, additional or fewer sources may be provided. In a single source configuration, a set of N mirrors (where N≥1) may be provided to split the light beam produced by the source into light beams 1210a and 1210b. For example, one or more of the mirrors may be coated with a film, such as a metal film, having a thickness that transmits about half of the incident light and reflects the other half. Thus, the source may direct a light beam toward a first mirror (e.g., a half-silvered mirror) that redirects a portion of the light beam along one of the opposing edges of the weigh platter 110 and another portion of the light beam to a second mirror, which redirects the light beam along the other opposing edge of the weigh platter 110 (which may require the use of one or more redirecting mirrors).

Figure 12B:
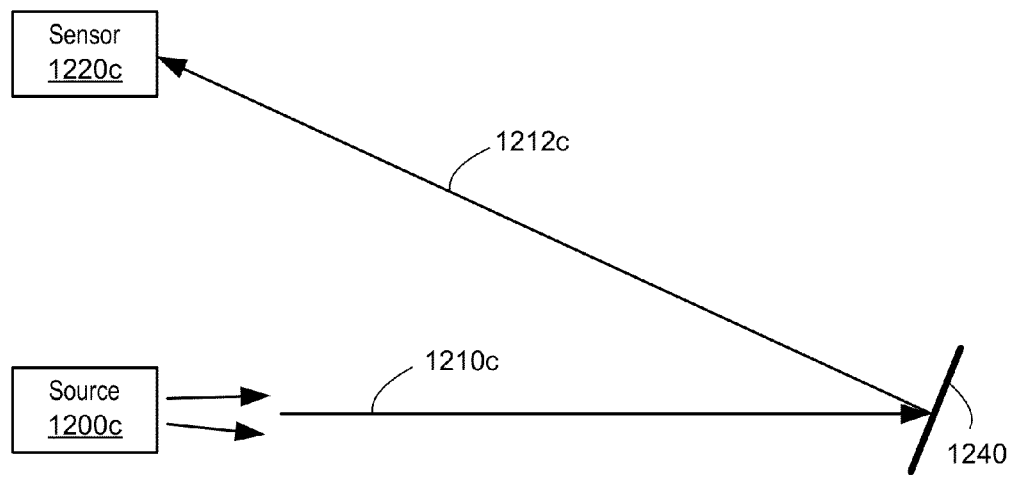
Figure 12C:
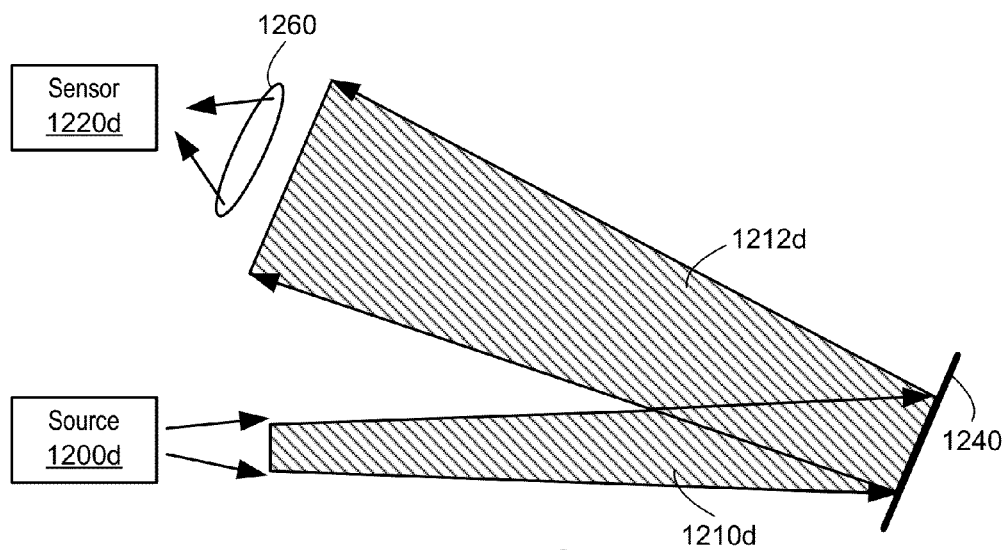

The sources 1200a and 1200b may be configured to transmit the light beams 1210a and 1210b, which may be minimally divergent as illustrated in FIG. 12B or moderately divergent as illustrated in FIG. 12C, over a surface of the weigh platter 110, a surface of the counter 160, another surface of the scanner system 100, or any combination thereof. Additionally, the sources 1200a and 1200b may be configured to transmit more than one light beam along opposing sides of the weigh platter 110 (e.g., over both the weigh platter 110 and the counter 160). If the weigh platter 110 comprises another geometric shape, such as a polygon or a circle, the sources 1200a and 1200b may be configured to transmit light beams along one or more of the edges of the polygon or around all or a portion of a perimeter of the circle.

Preferably, the sources 1200a and 1200b comprise infrared light emitting diodes (LEDs) emitting unmodulated electromagnetic radiation having a wavelength between approximately 750 nanometers and approximately one millimeter. However, the sources 1200a and 1200b may comprise other sources of light, such as an LED emitting another wavelength of light, a laser diode or other laser, or other suitable sources of light. Additionally, the light source 440 of the laser based scanner 190 may be directed using one or more lasers along opposing edges of the weigh platter 110.

A set of mirrors are positioned on an edge of the weigh platter 110 opposite the sources 1200a and 1200b and are configured to reflect the light beams 1210a and 1210b in a direction toward the sources 1200a and 1200b, but at an angle θ above (or below) the light beams 1210a and 1210b. For example, mirrors 1240a and 1240b may be supported on or embedded in the fruit rail 112. The angle θ may vary depending on the particular scanner system 100. For example, the angle θ may be selected such that reflected light beams 1212a and 1212b enter the upper housing 124 anywhere from slightly above the light beams 1210a and 1210b to slightly below the top of the upper housing 124.

Having the reflected light beams 1212a and 1212b travel toward the sensors 1220a and 1220b at an angle θ above the light beams 1210a and 1210b allows the sensors 1220a and 1220b to be supported on upper housing 124, without sending a light beam along a fruit rail edge of the weigh platter 110. If the light beam traveled between mirrors 1240a and 1240b, an item resting on the fruit rail 112 (and entirely resting on weigh platter 110) may falsely indicate that weighing error has occurred. In addition, the system may be easier to align and be less susceptible to misalignment during use if the mirrors 1240a and 1240b need only be directed toward sensors 1220a and 1220b instead of also be aligned with each other. Further, having the reflected light beams 1212a and 1212b travel toward the sensors 1220a and 1220b at an angle θ above (or below) the light beams 1210a and 1210b allows a larger area to be monitored (e.g., a taller item that overhangs scale may not block light beams 1210a or 1210b, but may block reflected beams 1212a or 1212b and thus detect a possible weighing error). Thus, having the reflected light beams 1212a and 1212b travel toward the sensors 1220a and 1220b at an angle θ above (or below) the light beams 1210a and 1210b helps ensure that possible weighing errors will be detected if items overhang the scale and contact the counter but do not block the lower beam (e.g., carrots with leafy stems).

In a preferred configuration, the sensors 1220a and 1220b comprise phototransistors configured to detect infrared light having a wavelength between approximately 750 nanometers and approximately one millimeter. However, the sensors 1220a and 1220b may comprise other suitable photodetectors capable of converting light into voltage or current, such as a phototransistor configured to detect other wavelengths, a photodiode, or a transducer that both emits and detects light. While FIG. 12A illustrates the sensors 1220a and 1220b installed in the upper housing 124, the sensors 1220a and 1220b may be installed elsewhere, such as the lower housing 122 or the counter 160. Additionally, one or more mirrors may be provided in the upper housing 124 to redirect the reflected light beams 1212a and 1212b toward the sensors 1220a and 1220b (so that the sensors 1220a and 1220b do not need to be in-line with the reflected light beams 1212a and 1212b).

A controller 1250 may be communicatively coupled to the sources 1200a and 1200b, the sensors 1220a and 1220b, or a combination thereof, and be configured to determine whether an item blocks or partially blocks any of the light beams 1210a or 1210b or reflected light beams 1212a or 1212b. For example, the controller 1250 may monitor an output of the sensor 1220a, the sensor 1220b, or both, for a voltage above or below a certain threshold (i.e., the threshold may be selected to indicate an amount of light incident upon the sensor that indicates that an item partially rests on a surface other than the weigh platter 110). For example, if an item, such as the carrot 1230 blocks or partially blocks the light beam 1210a, the output of the sensor 1220a may drop below a certain threshold voltage. If the item is repositioned so that it no longer blocks a light beam, the output of the sensor 1220a may rise above the threshold voltage indicating that an item no longer partially rests on a surface other than the weigh platter 110. The controller 1250 may be incorporated into the processor 240, or may comprise a standalone component, such as a commercially available processor or other logic machine capable of executing instructions.

One or more of light beams 1210a, 1210b, 1212a, and 1212b may be minimally divergent as illustrated in FIG. 12B or moderately divergent as illustrated in FIG. 12C. The divergence of light beams 1210a, 1210b, 1212a, and 1212b may be a function of the sources 1200a and 1200b (i.e., the source may produce a light beam that is minimally divergent or moderately divergent) or one or more lenses may be provided in a light path proximate the source to control the divergence. According to a preferred embodiment, the one or more lenses are convex lenses, but the one or more lenses may be spherical, cylindrical, sphero-cylindrical, or aspheric, for example, in which one or more surfaces is convex, concave, or planar. A cylindrical lens may, for example, help create a more vertical planar pattern.

With reference to FIG. 12B, the light source 1200c (which may be similar or identical to the sources 1200a and 1200b) is configured to transmit a minimally divergent light beam

1210c. For example, the minimally divergent light beam 1210c may have a beam width that is between approximately two degrees and approximately five degrees for the length of the beam's travel (e.g., the light beam 1210c may be collimated, much like a focused LASER beam). As described with reference to FIGS. 12A and 13, the minimally divergent light beam 1210c is directed to a reflective surface (e.g., mirror 1240b), which may be a mirror or other reflective element, and then reflected by the reflective surface. The reflected light beam 1212c is directed by the reflective surface toward a sensor 1220c (which may be an IR receiver or other suitable sensor, such as a sensor similar or identical to the sensors 1220a and 1220b). The source 1200c and reflective surface produce two distinct beams 1210c and 1212c. If the minimally divergent light beam 1210c, the reflected light beam 1212c, or both, are interrupted by an object or item that extends beyond an edge of the weigh platter surface, the sensor 1220c (which may be coupled to the controller 1250) indicates an off-scale or fault condition (i.e., an item extends between the weigh platter 110 and another surface, such as the counter or frame of the scanner). Thus the sensor 1220c, the controller 1250, or both, may monitor an amount of light incident the sensor 1220c (and possibly compare the detected amount of light to a threshold) to determine whether an item rests or partially rests on a surface other than the weigh platter 110.

With reference to FIG. 12C, the light source 1200d (which may be similar or identical to the sources 1200a and 1200b) is configured to transmit a moderately divergent light beam 1210d (the divergence of light beam 1210d is not to scale and is exaggerated for illustration purposes). For example, the moderately divergent light beam 1210d may have a beam width that is between approximately ten degrees and approximately 120 degrees for the length of the beam's travel (e.g., the moderately divergent light beam 1210d diverges relatively quickly along its path of travel). As described with reference to FIGS. 12A and 13, the moderately divergent light beam 1210d is directed to a reflective surface (e.g., mirror 1240b), which may be a mirror or other reflective element, and then reflected by the surface. The reflected light beam 1212d is directed by the reflective surface toward a sensor 1220d (which may be an IR receiver or other suitable sensor, such as a sensor similar or identical to the sensors 1220a and 1220b). The source 1200d and reflective surface produce two distinct beams 1210d and 1220d. If the moderately divergent light beam 1210d, the reflected light beam 1212d, or both, are interrupted by an object or item that extends beyond an edge of the weigh platter surface, the sensor 1220d (which may be coupled to the controller 1250) indicates an off-scale or fault condition (i.e., an item extends between the weigh platter 110 and another surface, such as the counter or frame of the scanner). Thus the sensor 1220d, the controller 1250, or both, may monitor an amount of light incident the sensor 1220d (and possibly compare the detected amount of light to a threshold) to determine whether an item rests or partially rests on a surface other than the weigh platter 110. One or more lenses 1260 may be provided to focus the reflected light beam 1212d onto the sensor 1220d. According to a preferred embodiment, the one or more lenses are convex lenses, but the one or more lenses may be spherical, cylindrical, spherocylindrical, or aspheric, for example, in which one or more surfaces is convex, concave, or planar. One possible advantage of using a moderately divergent light beam is that unlike the focused beam (e.g., of IR) of the minimally diverge light beam, the light (of the moderately divergent beam) diverges relatively quickly along its path and helps form a wider field of detection of an off-scale object or item.

According to one embodiment, a system for reducing weighing errors associated with data readers equipped with a weigh platter comprises a source configured to transmit two parallel light beams along opposing edges of the weigh platter, a set of mirrors positioned on an edge of the weigh platter opposite the source and configured to reflect the two parallel light beams in a direction toward the source at an angle above the light beams, a sensor configured to detect the reflected light beams, and a controller communicatively coupled to the detector, the controller configured to determine whether an item extends between the weigh platter and another surface by monitoring the sensor for an indication that any of the light beams have been interrupted. The source and the sensor are preferably supported on the vertical section of the system, which rising from an edge of the weigh platter extending between the opposing edges. The source preferably comprises two light emitting diodes emitting unmodulated electromagnetic radiation having an infrared wavelength and the sensor preferably comprises two photodiodes configured to detect unmodulated electromagnetic radiation having an infrared wavelength. The set of mirrors are preferably supported on a fruit rail that is positioned on an edge of the weigh platter opposite the source. An interlock component that is communicatively coupled to the controller is preferably provided and configured to disable a weigh function associated with the weigh platter when the controller determines that at least one of the light beams have been interrupted. In addition, external indicia are preferably provided to notify an operator that an item may not properly be weighed.

Figure 14:
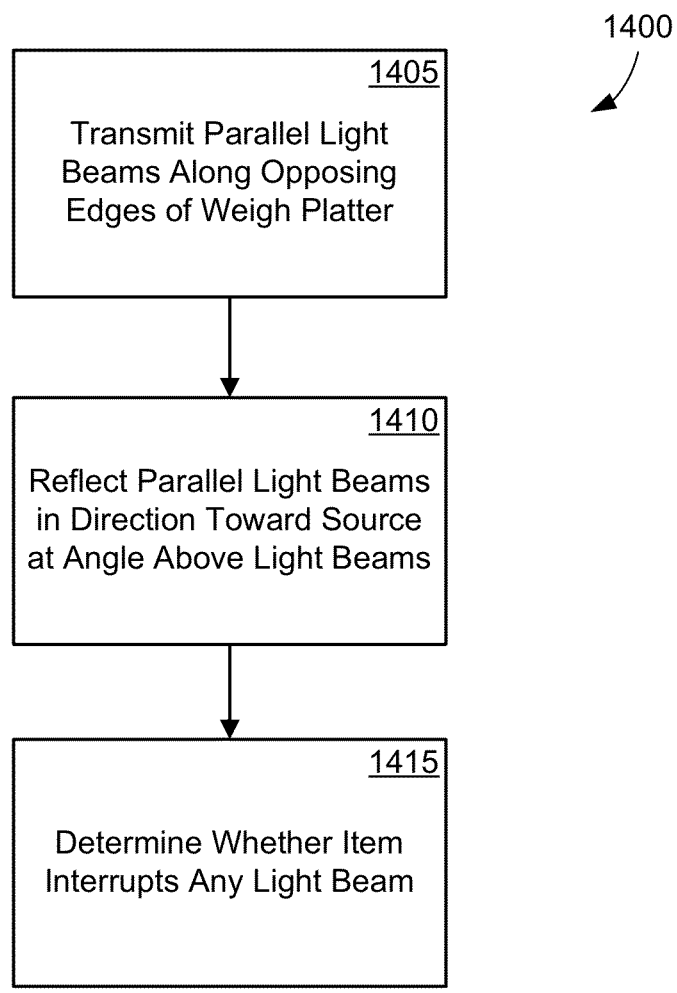
FIG. 14 is a high-level flowchart illustrating a method for reducing weighing errors associated with data readers, according to yet another embodiment.

FIG. 14 is a high-level flowchart illustrating a method 1400 for reducing weighing errors associated with data readers, according to one embodiment. Initially, one or more sources, one or more sensors, one or more mirrors or reflectors, or a combination thereof, are installed in the scanner system 100 and communicatively coupled to the controller 1250. For example, as shown in FIGS. 12A and 13, the sources 1200a and 1200b and the sensors 1220a and 1220b may be supported on the upper housing 124. The user can then operate the scanner system 100 in a conventional manner. For example, the user can position items proximate the lower window 130, the upper window 132, or both, in an attempt to read encoded symbols thereon. In addition, the user can weigh items by placing the items on the weigh platter 110.

At step 1405, parallel light beams are generated and transmitted along opposing edges of the weigh platter 110, and then at step 1410 the light beams are reflected (assuming the light beams have not been interrupted) in a direction toward the source at an angle above the light beams. In one example, the sources 1200a and 1200b may be configured to transmit light beams 1210a and 1210b along opposing edges of the weigh platter 110. The mirrors 1240a and 1240b may then reflect the light beams 1210a and 1210b in a direction toward the sources 1200a and 1200b at an angle θ above (or below) the light beams 1210a and 1210b to form reflected light beams 1212a and 1212b.

At step 1415, the method 1400 determines whether an item interrupts any of the light beams. For example, the controller 1250 may monitor the voltage (or current) generated by sensors 1220a and 1220b to determine whether an item interrupts any of the light beams 1210a, 1210b, 1212a, or 1212b. Upon detecting an interruption of one or more light beams, the method 1400 may notify the user that an item may not be properly weighed (i.e., an item extends between the weigh platter 110 and another surface, such as the counter or frame of the scanner) via the alert module 220 (FIG. 2). Additionally or alternatively, the method 1400 may halt the weighing operation until item is properly positioned via the interlock module 230.

Perimeter Pattern Scale Guard

FIG. 15-22 illustrate another possible implementation of the scale guard module 210 (of FIG. 2) utilizes a portion of a scan field of an optical code reader to scan a set of patterns extending along opposing edges of the weigh platter 110 to determine whether an item rests or partially rests on a surface other than the weigh platter 110, such as the counter 160 or the scanner frame. For example, the scale guard module 210 may comprise a set of instructions for scanning reference patterns 1500a and 1500b extending along opposing edges of the weigh platter 110 using an optical code reader or data reader of the scanner system 100e. Thus, the scale guard module 210 may be stored along with the applications 254 and other components 255 in memory 250, drive 260, or both. According to a preferred embodiment, an optical code reader in the upper housing portion 124, such as the imaging based scanner 180a or the laser based scanner 190a, attempts to detect the reference patterns 1500a and 1500b as illustrated by scan planes 1510a and 1510b in FIG. 15. As will be described in more detail below, if an item being weighed rests partially on the counter 160 or other fixed object and partially on the weigh platter 110, all or a portion of the reference pattern 1500a, the pattern 1500b, or both, will be blocked, which will alter the pattern read by the optical code reader. In other words, it is possible to determine whether an item rests partially on the checkout counter or other fixed object and partially on the weigh platter based on whether the item blocks a portion of the light that would otherwise reflect off a region proximate a lateral edge of the checkout counter surface or other fixed object.

Figure 15:
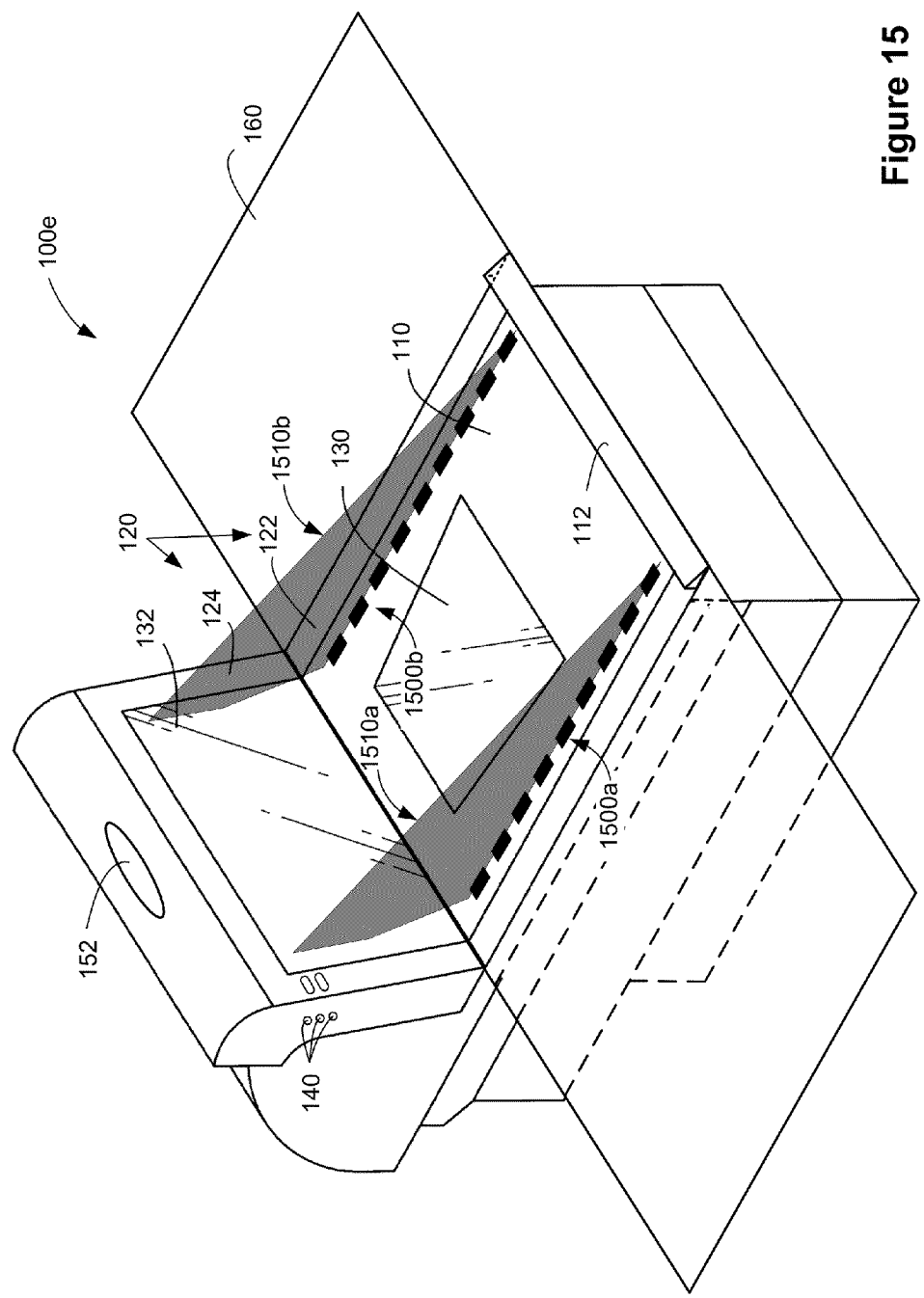
FIG. 15 a perspective view of a multiplane scanner including an perimeter-pattern scale-guard system, according to one embodiment.

The scanner system 100e illustrated in FIG. 15 is similar to the system 100 illustrated and described with reference to FIGS. 1-4, except the scanner system 100e includes a scale guard module that utilizes a portion of a scan field of an optical code reader to determine whether an item being weighed rests or partially rests on a surface other than the weigh platter 110. Thus, the scanner system 100e may include any of the components illustrated and described with reference to FIGS. 1-4, such as the scale module 200, the interlock module 230, the alert module 220, and the data reader.

Figure 16:
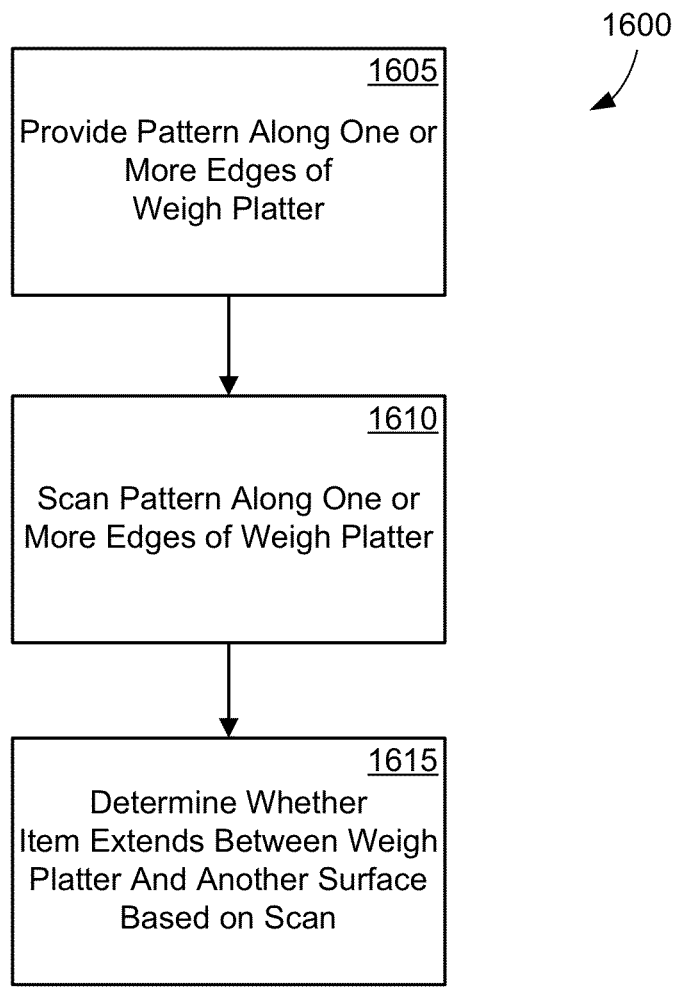
FIG. 16 is a high-level flowchart illustrating a method for reducing weighing errors associated with data readers, according to still another embodiment.

FIG. 16 is a high-level flowchart illustrating a method 1600 for reducing weighing errors associated with data readers, according to one embodiment. At step 1605, a set of N patterns (where N≥1) are positioned along one or more edges of the weigh platter 110. For example, as shown in FIG. 15, patterns 1500a and 1500b may be positioned along opposing edges of the weigh platter 110. The user can operate the scanner system 100 equipped with the set of patterns in a conventional manner. For example, the user can position items proximate the lower window 130, the upper window 132, or both, in an attempt to read encoded symbols thereon. In addition, the user can weigh items by placing the items on the weigh platter 110.

As will be described in more detail below, the set of patterns extending along one or more edges of the weigh platter are scanned at step 1610. Based on the scan, the method 1600 determines whether an item extends between the weigh platter and another surface at step 1615. According to a preferred embodiment, a portion of a scan field of an optical code reader is used to scan the set of patterns extending along opposing edges of the weigh platter 110. Thus, any optical code reader, such as the imaging based scanner 180 or the laser based scanner 190, may be used to implement one or more of the steps of the method 1600.

For an imaging based scanner, a portion of the imaging sensor's field of view may be used to scan the set of patterns extending along opposing edges of the weigh platter. For example, the method 1600 may read or assemble samples or pixels from the imager 330 lying along one or more lines across the image to form a desired scan pattern. The one or more lines may be oriented at any angle with respect to one another and preferably coincide with a main line of extent of each pattern in the set of patterns.

Figure 17:
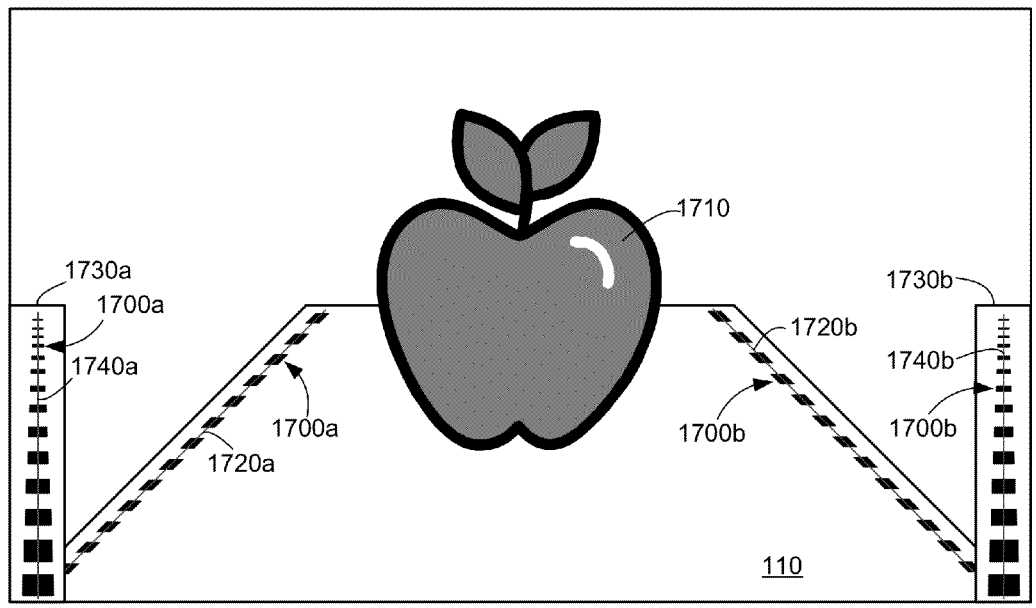
FIGS. 17 and 18 are example images captured by an imaging based scanner.

In addition, a set of N mirrors (where N≥1) may be provided and configured to align a portion of the imaging sensor's field of view with each pattern such that the scan plane associated with each pattern rises orthogonally from the surface of the weigh platter and extends along a main line or axis of extent of the pattern (see, e.g., auxiliary scanner views 1730a and 1730b of FIG. 17). In other words, the set of mirrors is configured to redirect a portion of the imaging sensor's field of view so that the portion of the field of view is in-line with the pattern (e.g., the portion of the field of view is looking straight at the pattern). According to one embodiment, the set of mirrors are positioned in the upper housing 124 and comprise final redirecting mirrors and intermediate redirecting mirrors interposed between the final redirecting mirrors and the imager 330. The final redirecting mirrors are positioned on opposing sides of the weigh platter such that the final redirecting mirrors lie in same plane as the scan plane associated with the respective platter pattern. For example, one final redirecting mirror may be positioned in the upper housing 124 behind upper window 132 (see FIG. 15) and lie in the same plane as the scan plane 1510a and another final redirecting mirror may be positioned in the upper housing 124 behind upper window 132 and lie in the same plane as the scan plane 1510b. Thus, the final redirecting mirrors redirect the respective scan planes (e.g., scan planes 1510a and 1510b) toward the imager 330. The intermediate redirecting mirrors are positioned between the final redirecting mirrors and the imager 330 to direct the respective scan planes onto the imager 330.

For a laser based scanner, a portion of the laser scanner's scan arc may be used to scan the set of patterns extending along opposing edges of the weigh platter. For example, a set of N mirrors (where N≥1), such as one or more of the pattern mirrors 460 (FIG. 4), may be positioned in the upper housing 124, the lower housing 122, or elsewhere on the scanner system 100 such that the set of mirrors intercept and redirect a portion of the scan arc to traverse each pattern in the set of patterns. Preferably, the set of N mirrors are configured such that a scan line (e.g., scan lines 462) formed by a respective mirror coincides with a main line of extent of each pattern in the set of patterns. In other words, the set of mirrors reside in locations that allow the scanner system 100 to "view" each pattern in the set of patterns along a main axis of extent of the pattern. According to one embodiment, the mirrors on either side of the platter that perform the final redirections of portions of the scan arc prior to exiting the housing essentially lie in the same planes as the scan arcs used to scan the respective platter patterns. Additionally, one or more intermediate mirrors may be interposed between the beam oscillator (e.g., the rotating polygon) and the final mirrors to direct the scanning arc to the final mirrors.

Figure 18:
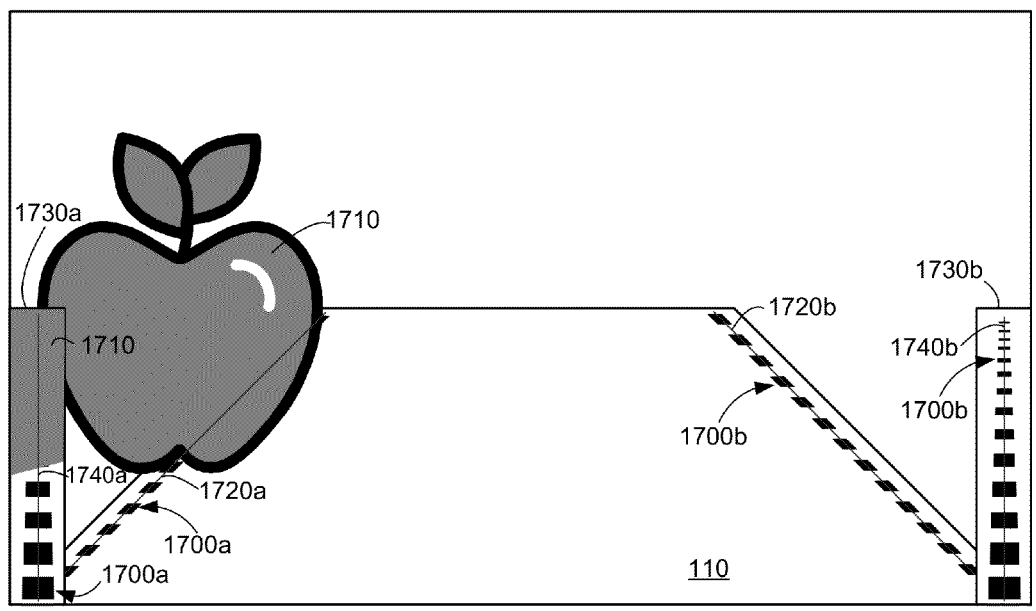

If an item extends between the weigh platter and another surface, all or a portion of at least one of the patterns in the set of patterns will be obscured by the item (see, e.g., FIG. 18). Thus, the set of patterns may be read to determine whether any of the patterns are at least partially blocked and thus whether an item extends between the weigh platter and another surface. A suitable technique may then be used to determine whether any of the patterns are at least partially blocked. For example, a controller, such as processor 240, may be communicatively coupled to one or more of the optical code readers (e.g., imaging based scanner 180 or laser based scanner 190) and configured to recognize whether the pattern read by the optical code reader indicates that an item bridges the weigh platter and another surface.

For a laser based scanner, a photodetector (e.g., photodetector 410 of FIG. 4) converts light reflected from the scanned pattern into a signal indicative of the relatively dark and the relatively light portions of the pattern (e.g., peaks and valleys corresponding to dark and light portions). Analog or digital techniques may then be used to process the signal output from the photodetector 410 in order to determine whether an item at least partially blocks any of the patterns.

For example, a filter tuned to the frequency of the pattern (see, e.g., FIG. 22) may be provided and monitored to determine whether the filter detects the frequency of the pattern. If an item blocks one of the patterns, the filter will not detect the frequency of the pattern for at least a portion of the scan arc. Thus, the controller could monitor the output of the filter to see whether the filter detects the frequency of the pattern over the relevant portion of the scan arc. The filtered signal may also be processed to count a total number of pulses (e.g., using edge detector 480) or to detect missing pulses (e.g., using a missing-pulse module activated when the patterns are being scanned). For example, as shown in FIG. 15, eighteen edges should be detected upon scanning the patterns 1500*a* or 1500*b*. If fewer than the expected number of edges (e.g., eighteen for patterns 1500*a* or 1500*b*) are detected, it may be inferred that an item is blocking a portion of the pattern. By way of another example, pulses indicative of edge transitions may be expected at certain points in the scan arc. If a pulse is detected unexpectedly or not detected when expected, it may be inferred that an item is blocking a portion of the pattern. Other techniques may be used and may be implemented digitally (e.g., by sampling the signal output from the photodetector).

Additionally, any of the above techniques for determining whether an item at least partially blocks any of the patterns may be implemented using an imaging based scanner. For example, after the user places an item to be weighed, such as apple 1710, on the weigh platter 110, an imaging based scanner, such as the imaging based scanner 180*a* (FIG. 2), or an imaging system, such as an imaging system supported by the upper housing section 124 or positioned some distance above weigh platter 110 and coupled to the scanning system 100*e*, captures an image of the weigh platter 110. FIG. 17 illustrates an example image captured where neither of patterns 1700*a* and 1700*b* extending along opposing edges of the weigh platter 110 are obstructed by the apple 1710. FIG. 18 illustrates an example image captured where the apple 1710 blocks a portion of the pattern 1700*a*.

After an image of the weigh platter 110 has been captured, the method 1600 can attempt to read the patterns 1700*a* and 1700*b* to determine whether either of the patterns 1700*a* and 1700*b* are at least partially blocked. For example, a virtual scan line extraction module may read or assemble samples or pixels from an imager lying along one or more lines (e.g., virtual scan lines 1720*a* and 1720*b*) corresponding to the patterns 1700*a* and 1700*b*. After the appropriate data along the one or more lines has been collected, the data is then analyzed to determine whether any patterns are at least partially blocked. For example, the data can be processed to locate edges (e.g., by identifying transitions from one set of pixels to another set of pixels) to determine, for example, whether or not an expected number of edges are present. With reference to FIG. 17, each of the patterns 1700*a* and 1700*b* comprise fourteen dark rectangles (one of which is blocked by auxiliary scanner views 1730*a* and 1730*b*). Thus, twenty-eight edges should be located, assuming an item, such as the apple 1710, is not blocking a portion of the pattern. However, as shown in FIG. 18, the apple 1710 blocks roughly half of the dark rectangles. Thus, upon processing the data associated with the virtual scan line 1720*a*, the total number of edge transitions would be less than expected, and the method 1600 could alert the operator that an item may not be accurately weighed.

Other techniques may be used to determine whether either of the patterns 1700*a* and 1700*b* are at least partially blocked. For example, a set of N mirrors (where N≥1) may be provided and configured to redirect a portion of the imaging sensor's field of view so that the portion of the field of view is in-line with the pattern (e.g., the portion of the field of view is looking straight at the pattern), as illustrated by auxiliary scanner views 1730*a* and 1730*b*. The patterns 1700*a* and 1700*b* are illustrated vanishing toward a point in the auxiliary scanner views 1730*a* and 1730*b*, which are exaggerated for illustration purposes. An image of the auxiliary scanner views 1730*a* and 1730*b* may then be captured, so that the method 1600 can attempt to read the patterns 1700*a* and 1700*b* to determine whether either of the patterns 1700*a* and 1700*b* are at least partially blocked. For example, a virtual scan line extraction module may read or assemble samples or pixels from an imager lying along virtual scan lines 1740*a* and 1740*b* and analyze the appropriate data along the virtual scan lines 1740*a* and 1740*b* to determine whether any patterns are at least partially blocked (as illustrated in FIG. 18).

Additionally, the captured image of the weigh platter 110, the auxiliary scanner views (e.g., 1730*a* and 1730*b*), or both, may be processed using other two-dimensional image processing techniques, such as background subtraction, contrast enhancement, and reference image differencing to determine if the perimeter patterns are fully in view or at least partially blocked.

Upon determining that at least a portion of one of the patterns is partially blocked by an item, the method 1600 may notify the user that an item may not be accurately weighed (i.e., an item extends between the weigh platter 110 and another surface, such as the counter or frame of the scanner) via the alert module 220. Additionally or alternatively, the method 1600 may halt the weighing operation until item is properly positioned via the interlock module 230.

Factors, such as dirt, spills, wear, or damage, may change the pattern over time or otherwise change what a reader captures as the pattern. Thus, the method 1600 may operate within fixed or adjustable operational tolerances to effectively ignore small imperfections caused by changes to the pattern over time. Additionally, other techniques may be used help prevent false positives (e.g., an incorrect determination that an item spans the weigh platter and another surface) caused by changes to the pattern over time, such as signal tracking and automated detection threshold adjustment. For example, the relatively light portions may be come darker if dirt collects over a portion of the pattern. Thus, the threshold used to signify an edge transition (e.g., a light-to-dark transition or dark-to-light transition) may automatically adjust over time in response to incremental changes to the signal resulting from scans of pattern over time.

The set of patterns positioned along opposing edges of the weigh platter 110 may be of any suitable form and preferably one that is easily recognizable by the optical code reader. For example, the set of patterns may comprise a repeating high contrast pattern (e.g., from the scanner's perspective) that provides a readily identifiable indication of whether or not the scan planes 1510a and 1510b are broken by items extending between the weigh platter 110 and another surface. As previously described, if an item extends between the weigh platter 110 and another surface (see, e.g., FIG. 18), a portion of the pattern will be obscured from the optical code reader and will alter a signal generated by the optical code reader.

According to a preferred embodiment, the set of patterns comprise high optical contrast patterns with respect to the optical reader that are minimally affected by wear caused by items being dragged across the weigh platter surface over time so that the optical reader generates a signal having a relatively high signal-to-noise ratio. For example, the set of patterns may comprise a series of holes extending through the weigh platter 110. The unbroken areas of surface of the weigh platter 110 can provide the relatively light portions of the pattern (e.g., the bright or high portions) and the holes piercing the surface of the weigh platter 110 can provide the relatively dark portions of the pattern (the dark or low portions) because little or no light will be reflected by the holes. Additionally, if the holes are of sufficient size and completely pierce the surface of the weigh platter 110, the holes may provide extra drainage for spills and may be relatively easy to keep debris free so that the high contrast pattern can be preserved after many hours of use. Additionally, the surface of the weigh platter 110 may be brushed (or sanded) in a direction parallel to item flow during scanning to create a plurality of random reflective facets oriented to reflect light back toward the optical reader. As items are slid in a direction parallel to the facets of the brushed surface, the directional reflective characteristics of the brushed surface may be preserved instead of removed.

Variations may be made to the series of holes extending through the weigh platter and the set of patterns may take other forms. For example, a contrasting material may be positioned in or below the holes. The contrasting material may help create the dark portions or may comprise a material having a higher reflectivity than the surface of the weigh platter. Additionally, while the holes may be rectangular, the holes may comprise any shape and may be of any size.

Instead of (or in addition to) extending through the surface of the weigh platter, the set of patterns may comprise an alternating pattern of depressions and relatively flat surfaces, an alternating pattern of protuberances and relatively flat surfaces, or any combination thereof (e.g., alternating pattern of depressions and protuberances). The depressions may comprise stamped depressions, hollows, or other concavities. The protuberances may comprise bulges, humps, or other projections. For example, the set of patterns may comprise a series of convex stamped hemispherical features, concave stamped hemispherical features, or both. The hemispherical surface helps ensure that some light emanating from the optical code reader (e.g., via illumination source 310 of FIG. 3) is reflected back toward the optical code reader in the form of a glow or bright highlight somewhere on the hemispherical surface. The features may take another shape, such as a paraboloid or hyperboloid. Additionally, the set of patterns may comprise any undulating surface pattern that causes light to be reflected back toward the optical code reader and away from the optical code reader in an alternating pattern.

The set of patterns may also comprise chemically blackened, painted, screened, or other darkening procedure applied to areas of the weigh platter 110. The darkened areas may be depressed to lessen wear, may be flush with a wear resistant coating, or any combination thereof. Additionally, the set of patterns may comprise adhesive backed labels including any pattern of relatively light or dark portions. Further, areas of retroreflective material may be used for the relatively light portions and a lack of the retroreflective material may be used for the relatively dark portions.

According to yet another embodiment, the set of patterns comprises a set of lights that underlie or are embedded into the surface of the weigh platter so that light is directed toward the optical code reader. For example, as described with reference to FIGS. 17 and 18 of U.S. Provisional Application No. 61/267,376, filed Dec. 7, 2009, a light guide may be disposed below the weigh platter 110 in a lower weigh platter section. One or more light sources may be disposed in the upper housing section 124 next to the edge of the weigh platter 110 and a light guide or light pipe is provided to carry visible illumination from the source or sources along the edges of the weigh platter 110. The light guide may have a rectangular, circular or other suitable cross section. The top surface of the light guide is modified to allow a certain amount of light to leak out along the guide's length. This treatment of the top surface may be surface roughening, small repeated faceting, or other patterning or openings to control light leakage along the length of the light guide. A desirable characteristic of the surface treatment is that the amount of light that leaks along the guide's length at any point is approximately the same, thus making the perimeter pattern's visible illumination approximately uniform along the entire length. Openings in the opaque surface of the weigh platter 110 allow the leaked light to be visible.

According to still another embodiment, the set of patterns may comprise a plurality of features (e.g., one or more of a series of holes extending through the weigh platter, alternating pattern of protuberances and relatively flat surfaces, chemically blackened, painted, screened areas, areas of retroreflective material, and a set of lights that underlie or are embedded into the surface of the weigh platter) for making the relatively light and dark portions. Having more than one type of the feature provides redundancy so that the pattern may be detected under a variety of conditions and by a variety of optical code readers. Additionally, the set of patterns may be made up of one or more portions of features, each of which includes a distinct feature (e.g., a portion of the pattern that is further away from the optical code reader may comprise a different feature to facilitate detection).

The set of reference patterns may be incorporated, positioned, or included on the weigh platter 110 along a lateral edge (as shown in FIG. 15), the counter 160, a frame of the scanner system 100e, elsewhere on the scanner system 100d, or any combination thereof. The reference pattern is preferably or would be most conveniently positioned on the top surface of the weigh platter itself, in a region proximate the lateral edge. Alternately, the reference pattern may be positioned on the frame of the scanner-scale proximate the lateral edge of the weigh platter. Alternately, the reference pattern may be positioned on the surface of the checkout counter, again proximate the lateral edge of the weigh platter. Each of these three locations (on the platter, on the frame of the scanner-scale, on the checkout counter) is still in the region proximate the lateral edge of the weigh scale. Additionally, a set of reference patterns may be installed proximate a fruit-rail edge of the weigh platter 110. If the weigh platter 110 comprises another geometric shape, such as a polygon or a circle, the set of patterns may be installed along one or more of the edges of the polygon or around all or a portion of a perimeter of the circle. Additionally, multiple sets of patterns may be provided one or more lateral edges of the weigh platter 110.

Figure 20:
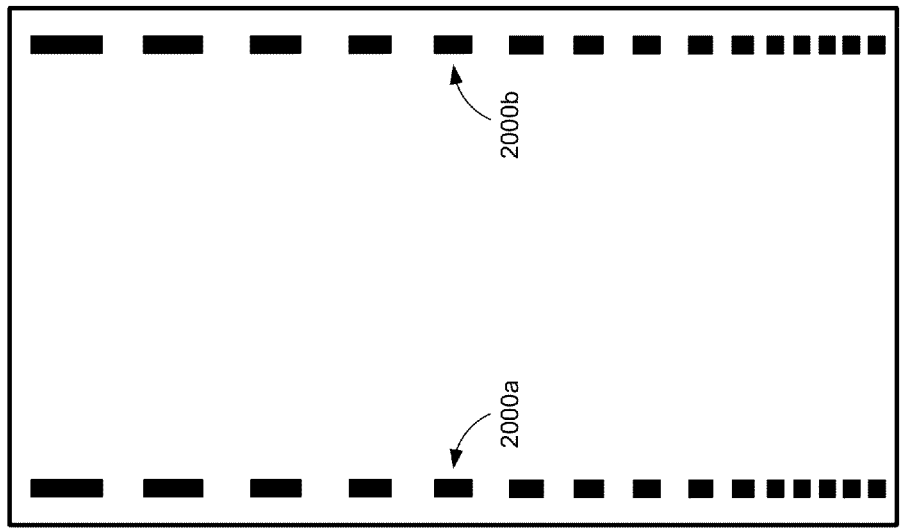
FIGS. 19 and 20 are plan views of weigh platters incorporating uniform and non-uniform perimeter patterns, respectively.
Figure 19:
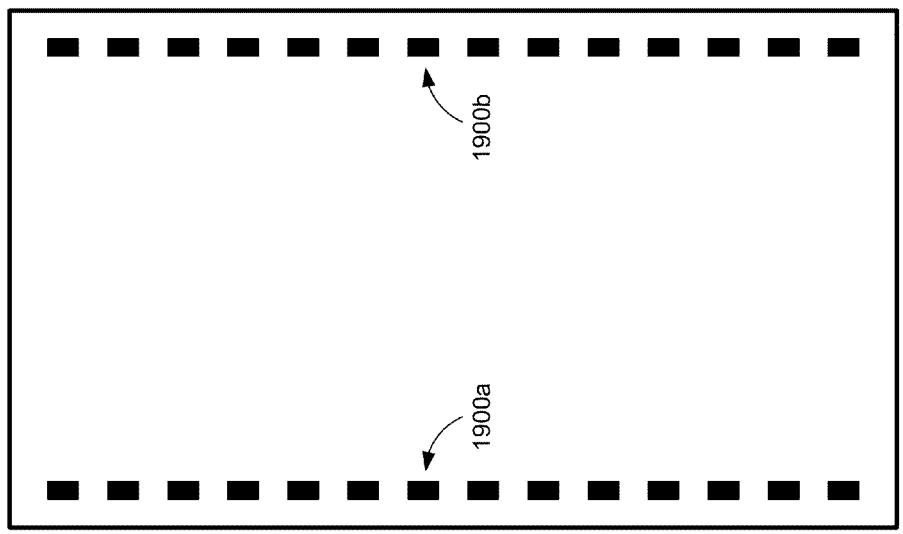
Figure 21:
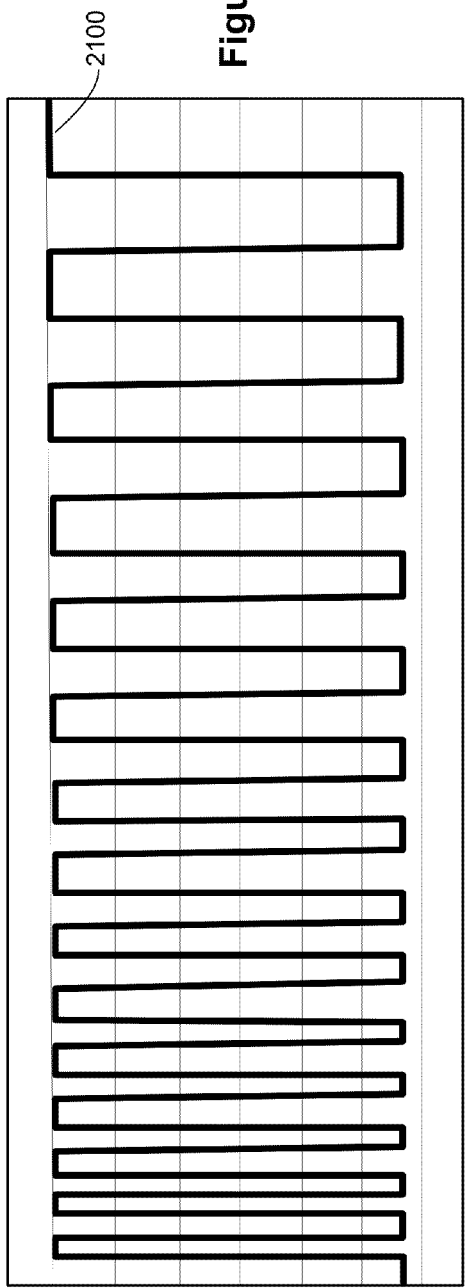
FIGS. 21 and 22 are example scan signals from scans of uniform and non-uniform perimeter patterns, respectively.
Figure 22:
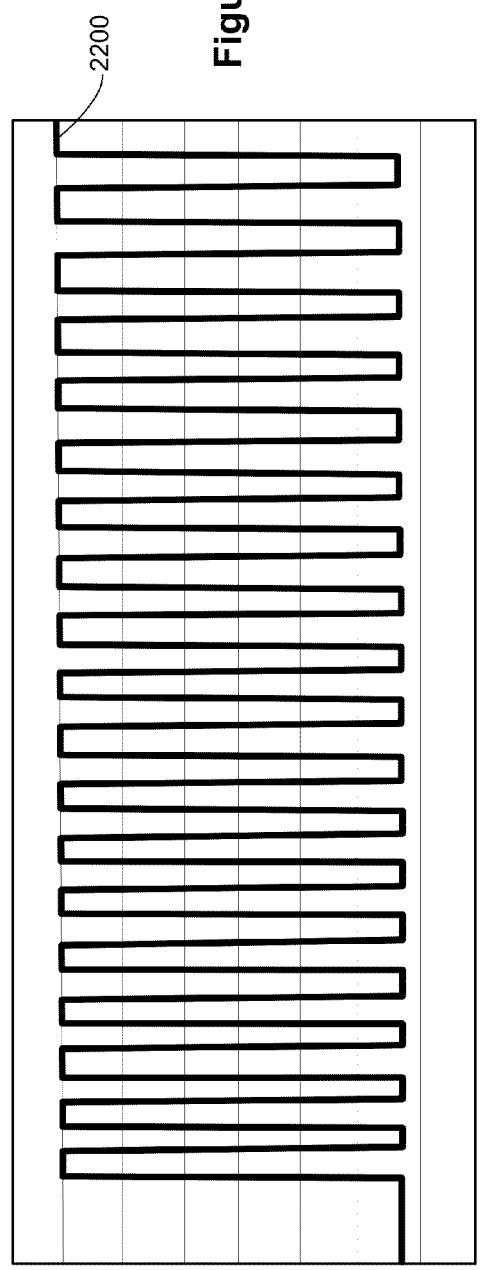

The set of patterns may comprise a regularly spaced pattern (e.g., a constant spatial frequency), such as the patterns 1900*a* and 1900*b* illustrated in FIG. 19. However, the regularly spaced pattern may appear unevenly spaced due to a scan angle of the optical code reader along the length of the pattern (see, e.g., the auxiliary scanner views 1730*a* and 1730*b*). Thus, the pattern frequency can be varied along its length as shown in FIG. 20 (e.g., a varying spatial frequency) so that when patterns 2000*a* and 2000*b* are scanned, the resulting signal comprises a constant frequency (which may reduce the signal processing burden). For example, FIG. 21 illustrates an example signal 2100 resulting from a scan of the pattern 1900*a*, pattern 1900*b*, or both, at an arbitrary scan angle. FIG. 22 illustrates an example signal 2200 resulting from a scan of the pattern 2000*a*, pattern 2000*b*, or both.

One possible advantage of the perimeter pattern scale guard is that existing systems may easily be upgraded in the field by providing the user with the set of patterns, such as a set of adhesive backed labels or a replacement weigh platter 110 including the set of patterns, and a scale guard module 210 (e.g., stored on a machine-readable medium) comprising a set of instructions for scanning the set of patterns extending along opposing edges of the weigh platter 110 using a portion of the optical code reader's scan field. After the user installs the set of patterns and the scale guard module 210, the scanner will monitor the edges of the weigh platter to determine whether an item might not be properly weighed. Part of the installation process might include identifying a particular make and model of scanner, so that the scale guard module can access a data table including approximate locations of the edges of the weigh platter within the imager's field of view. In addition, part of the installation process might include steps to locate the set of patterns within the field of view. For example, even though the user may be instructed to install the set of patterns a predetermined distance from the edges, the set of patterns may not appear in the field of view where expected. Thus, the scale guard module may search within the imager's field of view to locate the set of patterns within operational tolerances (e.g., using a sum of absolute differences calculation between the pixels within the imager's field of view and an expected representation of the set of patterns within the field of view).

Edge Vision Scale Guard

Figure 23:
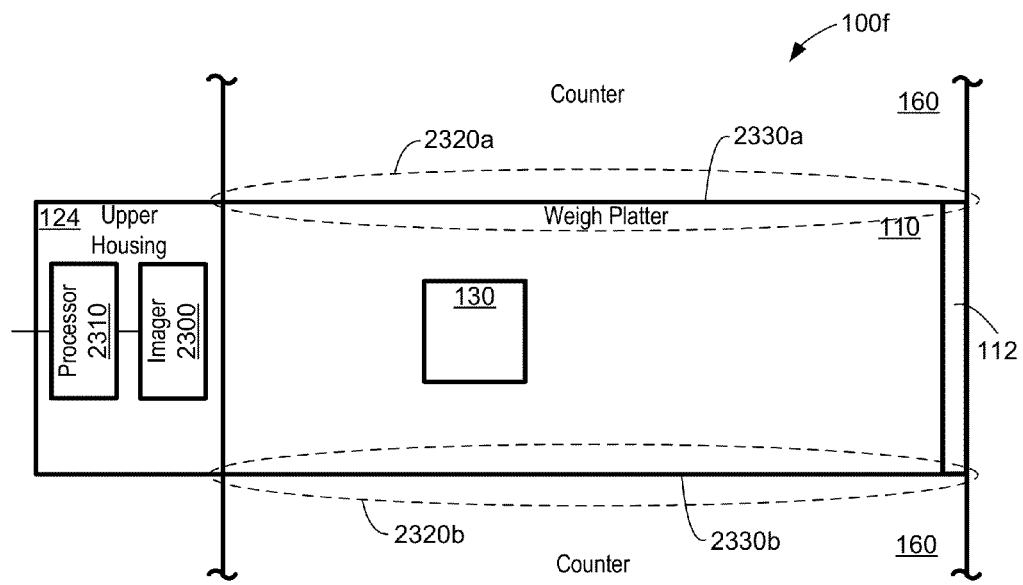
FIG. 23 is a high-level block diagram of a multiplane scanner including an edge-vision scale-guard system, according to one embodiment.
Figure 24:
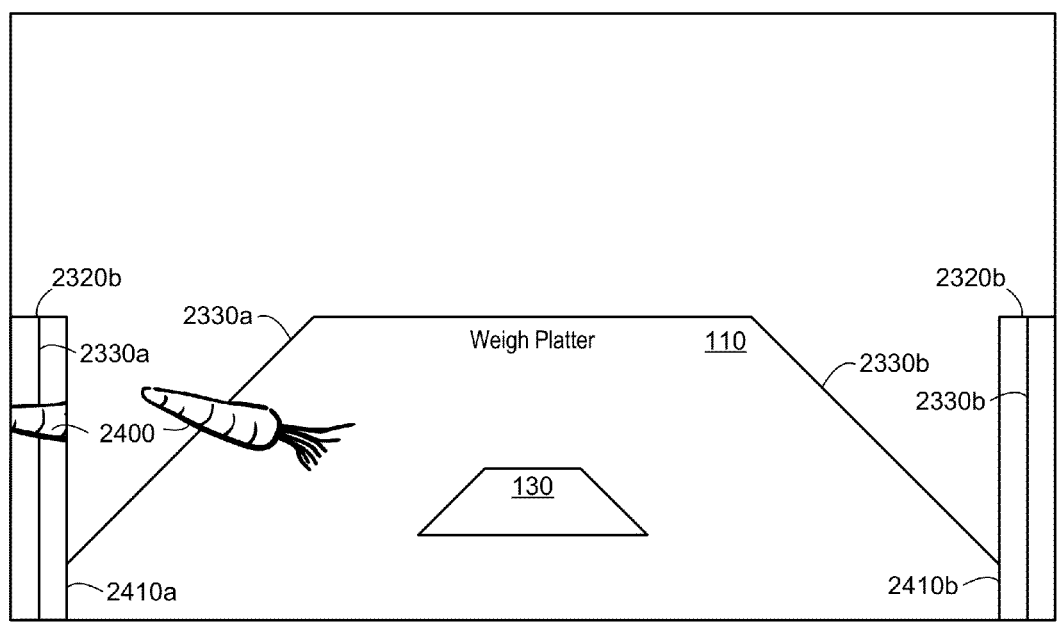
FIG. 24 is an example image captured by the scanner of FIG. 23.
Figure 25:
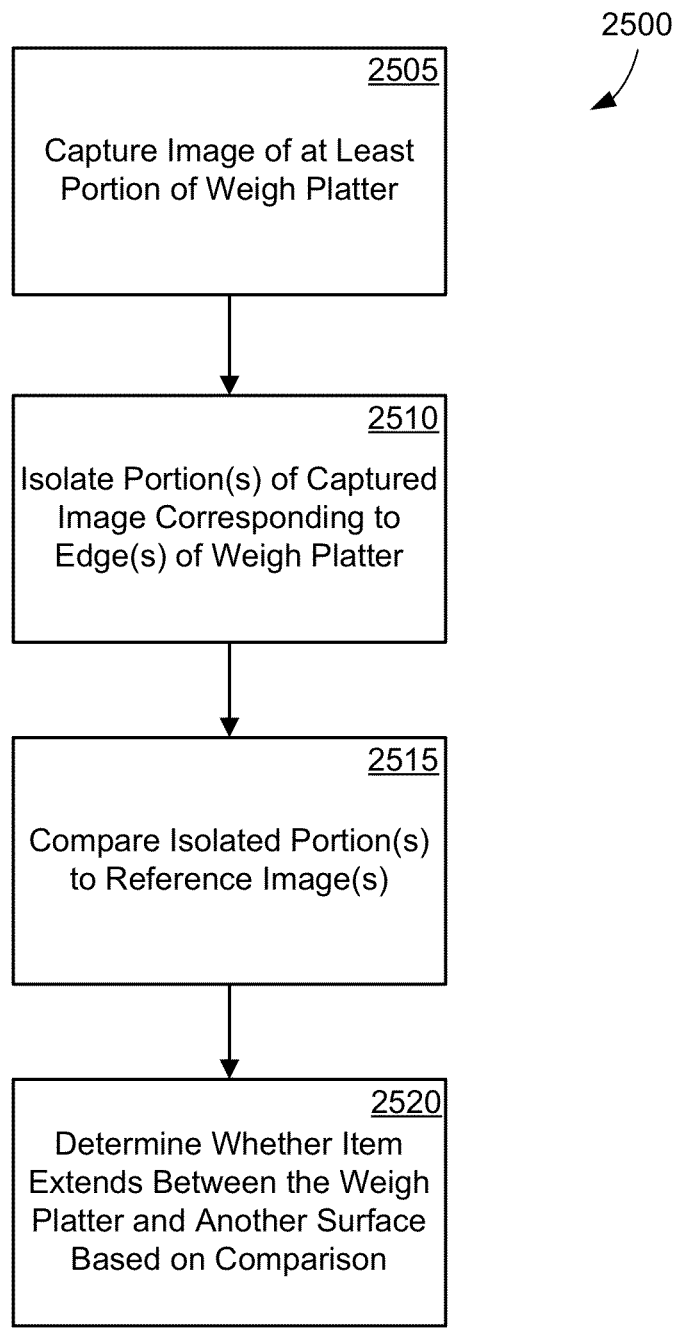
FIG. 25 is a high-level flowchart illustrating a method for reducing weighing errors associated with data readers, according to yet another embodiment.

FIGS. 23-25 illustrate another possible implementation of the scale guard module 210 (of FIG. 2) utilizing an imaging based scanner to capture an image of opposing edges of the weigh platter 110 to determine whether an item rests or partially rests on a surface other than the weigh platter 110, such as the counter 160 or a scanner frame. For example, the scale guard module 210 may comprise a set of instructions for capturing an image of the weigh platter 110, or edges thereof, and comparing the captured image to a reference image. Thus, the scale guard module 210 may be stored along with the applications 254 and other components 255 in memory 250, drive 260, or both. According to a preferred embodiment, an optical code reader in the upper housing portion 124, such as the imaging based scanner 180*a*, is used to capture the image. As will be described in more detail below, if an item being weighed rests partially on the counter 160 and partially on the weigh platter 110, the captured image will vary in a determinable manner from the reference image along all or a portion of edges of the weigh platter 110.

FIG. 23 is a high-level block diagram of the scanner system 100*f* including an imager 2300 communicatively coupled to a processor 2310. The imager 2300 is configured to capture an image of the weigh platter 110 and the counter 160 (or another surface that surrounds or partially surrounds the weigh platter 110). Because scale guard module 210 attempts to determine whether an item being weighed rests partially on the counter 160 and partially on the weigh platter 110, the imager 2300 may capture an image only of areas or regions of interest 2320*a*, 2320*b*, or both, proximate a lateral edge of the weigh platter 110, which includes edges 2330*a*, 2330*b*, or both, over which an item being weighed might lie. The images of the areas of interest 2320*a* and 2320*b* may be obtained in other ways, such as pulling only data corresponding to the areas of interest 2320*a* and 2320*b* from the imager 2300 or otherwise filtering or masking image data from the imager 2300.

The imager 2300 may comprise the imaging based scanner 180 (e.g., the imaging based scanner 180*a* in the upper housing 124) or may comprise a separate imager or imaging system for capturing an image of an object (e.g., a CCD or CMOS digital camera) along with any associated optics. The separate imaging system may be supported by the upper housing section 124 or positioned some distance above weigh platter 110 and coupled to the scanning system 100*f*. Likewise, the processor 2310 may comprise the processing unit 240 or any other suitable commercially available processor or logic machine capable of executing instructions.

The processor 2310 is configured to compare one or more captured images to one or more reference images. If no item overlaps either of the opposing edges 2330*a* or 2330*b*, the captured image should be identical to or similar to the reference image. However, if an item overlaps one of the opposing edges 2330*a* or 2330*b*, the captured image will differ from the reference image. In other words, the processor is configured to determine whether an item rests partially on the checkout counter or other fixed object and partially on the weigh platter based on whether the item blocks a portion of the light that would otherwise reflect off of a region proximate the lateral edge of the top surface of the weigh platter (or a region proximate the lateral edge of the top surface of the checkout counter or other fixed object). FIG. 24 illustrates an example image captured where an item, such as carrot 2400, blocks the edge 2330*a*. According to one embodiment, a set of N mirrors (where N≥1) are provided and configured to redirect a portion of the image sensor's field of view so that the portion of the field of view is in-line with the opposing edges 2330*a* or 2330*b* (e.g., the portion of the field of view is looking straight at the edges), as illustrated by auxiliary scanner views 2410*a* and 2410*b*. The mirrors may be configured to coincide with the areas of interest 2320*a* and 2320*b*, so that only image data corresponding to auxiliary scanner views 2410*a* and 2410*b* needs to be captured.

The scanner system 100*f* illustrated in FIG. 23 is similar to the system 100 illustrated and described with reference to FIGS. 1-4, except the scanner system 100*f* includes a scale guard module that utilizes an imaging based scanner to capture an image of opposing edges of the weigh platter 110 to determine whether an item being weighed rests or partially rests on a surface other than the weigh platter 110. Thus, the scanner system 100*f* may include any of the components illustrated and described with reference to FIGS. 1-4, such as the scale module 200, the interlock module 230, the alert module 220, and the data reader.

FIG. 25 is a high-level flowchart illustrating a method 2500 for reducing weighing errors associated with data readers, according to yet another embodiment. Initially, the imager is positioned such that one or more edges of the weigh platter (e.g., opposing edges 2330a and 2330b) are within the field of view of the imager. For example, the imaging based scanner 180a or another imager may be supported on the upper housing 124. Additionally, the set of N mirrors may be provided and configured to redirect a portion of the image sensor's field of view so that the portion of the field of view is in-line with the opposing edges 2330a or 2330b. An image of the weigh platter 110 and the counter 160 (or the areas of interest 2320a and 2320b) may then be captured without an item overlapping the edges 2330a and 2330b and stored as a reference image.

At step 2505, an image of at least a portion of the weigh platter is captured (e.g., in response to a weigh request from the host 292). For example, the captured image may include the entire surface of the weigh platter 110 along with a portion of what surrounds weigh platter 110, such as the counter 160. However, instead of capturing an image of the entire surface of the weigh platter 110, the method 2500 may capture an image of the opposing edges 2330a and 2330b along with a portion of what is located on each side of the opposing edges 2330a and 2330b (e.g., the areas of interest 2320a and 2320b). The captured image may also include other edges and surroundings thereof, such as a fruit rail edge of the weigh platter 110.

At step 2510, one or more portions of the captured image corresponding one or more edges of the weigh platter are isolated. For example, the processor 2310 may read or assemble samples or pixels from the imager 2300 corresponding to the areas of interest 2320a and 2320b (e.g., read and store pixels from only certain columns and rows of the imager 2300). The one or more portions of the image may be isolated in other ways, such as storing the entire image in a memory (e.g., memories 250 or 260) and masking off certain portions of the image (e.g., process only certain portions of the image). While the one or more portions of the image need not be isolated in every embodiment, processing a select portion of the image may speed up the comparison to the reference image.

At step 2515, the captured image (or a portion thereof) is compared to the reference image (or a corresponding portion thereof). Based on the comparison, it can be determined whether an item extends between the weigh platter and another surface at step 2520. For example, the processor 2310 may take the sum of absolute differences between the pixels in the captured image and the reference image. In other words, the processor 2310 may take the absolute value of the difference between each pixel in the captured image (or portion thereof) and a corresponding pixel in the reference image (e.g., by snaking through the captured image in a serpentine like manner), and summing the differences to derive a metric of similarity between the images. If the images are identical, the sum of absolute differences will be zero. However, if the images are different (e.g., due to an item overlying an edge of the weigh platter), the sum of absolute differences will reflect the differences between the images. Thus, the processor 2310 may determine that an item extends between the weigh platter and another surface if the sum of absolute differences calculation exceeds a certain threshold within operational tolerances.

While, sum of absolute differences calculations may be used to compare the captured image to the reference image, other methods may be used. For example, a sum of squared differences may be used. Additionally, other two-dimensional image processing techniques may be used, such as background subtraction and contrast enhancement. Further, the method 2500 may search for one or more edges (e.g., edges 2330a and 2330b) in the reference image using any number of edge detection techniques. After identifying an edge in the reference image, the method 2500 may search for the same edge (in the same approximate relative location) in the captured image to determine if the edge is fully in view or at least partially blocked.

The reference image may be captured at any time and according to any technique. For example, the reference image may be captured and stored after the imager 2300 has been installed (e.g., as part of a calibration procedure). In addition or alternatively, the reference image may be obtained in other manners, such as capturing the reference image when the scale indicates a weight of approximately zero (and it can thus be inferred that there are no items on the scale or partially on the scale). By way of another example, the reference image may be the other opposing edge of the weigh platter (e.g., assuming the item does not overlap the opposing edges in exactly the same manner, the auxiliary scanner views 2410a and 2410b may be compared). Additionally, one or more images of the weigh platter 110 and the counter 160 (or the areas of interest 2320a and 2320b) may be captured over time (e.g., daily, weekly, or monthly) to adjust or compensate for changes to or wear of the weigh platter over time (e.g., as part of a calibration routine run as the scanner initiates).

Upon determining that an item extends between the weigh platter and another surface, the operator may be notified via the alert module 220 (FIG. 2) that an item may not be accurately weighed (i.e., an item extends between the weigh platter 110 and another surface, such as the counter or frame of the scanner). Additionally or alternatively, the method 2500 may halt the weighing operation until the item is properly positioned via the interlock module 230.

One possible advantage of the edge vision scale guard is that existing scanner-scale systems may readily be upgraded in the field by providing the user with the scale guard module 210 (e.g., stored on a machine-readable medium) comprising a set of instructions for capturing an image of the weigh platter (or a portion thereof) to a reference image, and one or more imagers (if required). Once the scale guard module 210 and any required imager(s) have been installed, the scanner will be able to monitor the edges of the weigh platter to determine whether an item might not be properly weighed. Part of the installation process may include identifying a particular make and model of scanner, so that the scale guard module can access a data table including approximate locations of the edges of the weigh platter within the imager's field of view.

The methods and systems disclosed herein may be implemented in or by any suitable hardware, software, firmware, or combination thereof. Accordingly, as used herein a component or module can comprise hardware, software, firmware, or any combination thereof (e.g., self-contained hardware or software components that interact with a larger system). For example, the methods and systems may exist as one or more software or firmware programs comprised of program instructions in source code, object code, executable code or other formats. A software module or component may include any type of computer instruction or computer executable code located within a memory device or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local or remote memory storage devices. In addition, data being tied or rendered together in a database record may be resident in the same memory device, or across several memory devices, and may be linked together in fields of a record in a database across a network.

Embodiments may include various steps, which may be embodied in machine-executable instructions to be executed by a general-purpose processor, special-purpose processor, or other electronic device. Alternatively, the steps may be performed by hardware components that include specific logic for performing the steps or by a combination of hardware, software, firmware, or any combination thereof. A result or output from any step, such as a confirmation that the step has or has not been completed or an output value from the step, may be stored, displayed, printed, or transmitted over a wired or wireless network.

Embodiments may also be provided as a computer program product embodied on a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product embodied on a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

While embodiments disclosed herein have been discussed in combination with barcodes, the embodiments disclosed herein may be utilized by other automated data collection/capture techniques including, but not limited to, magnetic stripes, optical card readers, voice recognition, and smart card or radio frequency identification. Further, while the various scale guard module embodiments described herein have been described with reference to a data reader or scanner system, the scale guard module embodiments described herein are equally applicable to other systems that incorporate or interact with a weigh scale, such as package or parcel handling machines and equipment and luggage sorting and handling machines and equipment. Additionally, while various examples of the scale guard module 210 have been described herein, other systems and methods may be used to determine whether an item extends between the weigh platter 110 and the counter 160, which may affect the accuracy of the weight measurement. For example, the scale guard module 210 may comprise any combination of the embodiments described herein or in U.S. Provisional Application No. 61/267,376, filed Dec. 7, 2009. Utilizing multiple systems and methods to determine whether an item extends between the weigh platter 110 and the counter 160 may add redundancy in case one or more of the systems fail (or produces an inaccurate result) and may produce a more accurate determination of whether an item extends between the weigh platter 110 and the counter 160. Additionally, individual determinations of whether an item extends between the weigh platter and another surface from multiple systems and methods may be weighted to determine an overall confidence level of whether or not an item extends between the weigh platter and another surface.

As should be appreciated in view of the teachings herein, certain embodiments may be capable of achieving certain advantages, including by way of example and not limitation one or more of the following: (1) providing a system and method for reducing scale shrinkage; (2) provide noninvasive system and method to reduce scale shrinkage; (3) providing a system and method for reducing scale shrinkage with no additional electrical connections proximate the weigh platter; (4) providing a low cost system for reducing scale shrinkage; (5) providing a system for reducing scale shrinkage utilizing existing components; (6) providing a system for reducing scale shrinkage with minimal additional hardware; (7) providing a non-light-beam-based system for reducing scale shrinkage; and (8) providing a system and method for reducing scale shrinkage having no physical bump or barrier in a slide path of the scanner.

The terms and descriptions used herein are set forth by way of illustration only and are not meant as limitations. Those skilled in the art will recognize that many variations can be made to the details of the above-described embodiments without departing from the underlying principles of the invention. The scope of the invention should therefore be determined only by the following claims (and their equivalents) in which all terms are to be understood in their broadest reasonable sense unless otherwise indicated.

The invention claimed is:

1. A system for reducing weighing errors of an item being weighed on a weigh platter of a scale associated with a data reader installed in a checkout counter surface or other fixed object, the system comprising:
    a weigh platter including a top surface adjacent the checkout counter surface or other fixed object, the top surface of the weigh platter including a lateral edge that is adjacent an edge of the checkout counter surface or other fixed object;
    a data reader configured to detect a change in light reflected off a region of the top surface of the weigh platter proximate the lateral edge of the top surface of the weigh platter; and
    a controller coupled to the data reader, the controller configured to determine whether an item rests partially on the checkout counter or other fixed object and partially on the weigh platter based on whether the item blocks a portion of the light that would otherwise reflect off of said region proximate the lateral edge;
    a reference pattern positioned on the top surface of the weigh platter proximate and along the lateral edge,
    wherein the data reader is configured to detect the pattern when the pattern is unobstructed by an item and the controller is configured to determine whether an item blocks a portion of the light that would otherwise reflect off of the region proximate the lateral edge of the top surface of the weigh platter based on whether the item interrupts the reference pattern.

2. The system of claim 1, wherein the data reader comprises an imaging based scanning system including an image sensor that detects an image of a target within a field of view of the image sensor, and the imaging based scanning system is configured such that a full extent of the reference pattern is within the field of view of the image sensor when the reference pattern is unobstructed.

3. The system of claim 1, wherein the data reader comprises a laser based scanning system configured to generate a scan pattern along a scan arc, project the scan pattern onto an optical code, and detect light reflected by the optical code for decoding the optical code, and the laser based scanning system is further configured to project at least a portion of the scan arc along a full extent of the reference pattern when the reference pattern is unobstructed and to detect light reflected by the pattern.

4. A system for reducing weighing errors of an item being weighed on a weigh platter of a scale associated with a data reader installed in a checkout counter surface or other fixed object, the system comprising:
a weigh platter including a top surface adjacent the checkout counter surface or other fixed object, the top surface of the weigh platter including a lateral edge that is adjacent an edge of the checkout counter surface or other fixed object;
a data reader configured to detect a change in light reflected off a region of the top surface of the weigh platter proximate the lateral edge of the top surface of the weigh platter; and a controller coupled to the data reader, the controller configured to determine whether an item rests partially on the checkout counter or other fixed object and partially on the weigh platter based on whether the item blocks a portion of the light that would otherwise reflect off of said region proximate the lateral edge;
an imager configured to capture an image of the region proximate the lateral edge of the top surface of the weigh platter; and
a memory for storing a reference image, the reference image comprising an image of the region proximate the lateral edge of the top surface of the weigh platter when an item does not rest partially on the weigh platter and partially on the checkout counter or other fixed object,
wherein the controller is configured to cause the imager to capture an image of the region proximate the lateral edge of the top surface of the weigh platter and determine whether an item blocks a portion of the light that would otherwise reflect off of the region of the top surface of the weigh platter based on a comparison of the captured image and the reference image.

5. A system for reducing weighing errors of an item being weighed on a weigh platter of a scanner-scale associated with a data reader installed in a checkout counter surface or other fixed object, the system comprising:
a weigh platter including a top surface adjacent the checkout counter surface or other fixed object, the top surface of the weigh platter including first and second lateral edges that are adjacent respective first and second edges of the checkout counter surface or other fixed object;
a first reference pattern positioned on the top surface proximate and along the first lateral edge of the weigh platter;
a data reader configured to detect the first reference pattern when the first reference pattern is unobstructed; and
a controller coupled to the data reader, the controller configured to determine whether an item rests partially off the weigh platter based on whether the item interrupts the first reference pattern.

6. The system of claim 5, further comprising:
a second reference pattern positioned on the top surface proximate and along the second lateral edge of the weigh platter,
wherein the data reader is configured to detect the second reference pattern when the second pattern is unobstructed and the controller is configured to determine whether an item rests partially off the weigh platter based on whether the item interrupts at least one of the first reference pattern and the second reference pattern.

7. The system of claim 5, wherein the data reader comprises an imaging based scanning system including an image sensor that detects an image of a target within a field of view of the image sensor, and the imaging based scanning system is configured such that a full extent of the first reference pattern is within the field of view of the image sensor when the first reference pattern is unobstructed.

8. The system of claim 5, wherein the data reader comprises a laser based scanning system configured to generate a scan pattern along a scan arc, project the scan pattern onto an optical code, and detect light reflected by the optical code for decoding the optical code, and the laser based scanning system is further configured to project at least a portion of the scan arc along a full extent of the first reference pattern when the first reference pattern is unobstructed and to detect light reflected by the first reference pattern.

9. The system of claim 5, further comprising:
a set of mirrors configured to redirect a line-of-sight of the data reader to read along a lengthwise region of the surface proximate and along the first lateral edge of the weigh platter corresponding to the first reference pattern.

10. The system of claim 5, further comprising:
a filter coupled to the data reader, wherein the filter is tuned to a frequency of the first reference pattern, an output of the filter indicating whether the item at least partially interrupts the first reference pattern, and wherein the controller is configured to monitor the output of the filter to determine whether the item rests partially off the weigh platter.

11. The system of claim 5, further comprising:
an edge detector coupled to the data reader, wherein the edge detector is configured to detect edge transitions in the first reference pattern and the controller is configured to monitor the number of edge transitions detected by the edge detector to determine whether the item rests partially off the weigh platter.

12. The system of claim 5, further comprising:
an interlock component coupled to the controller and configured to disable a weigh function associated with the weigh platter when the controller determines that an item rests partially off the weigh platter.

13. The system of claim 5, further comprising:
external indicia configured to notify an operator of whether an item rests partially off the weigh platter.

14. The system of claim 5 wherein the first reference pattern comprises regularly spaced apart features.

15. The system of claim 5 wherein the first reference pattern comprises non-uniformly spaced apart features and the spacing between the features is selected to compensate for a scan angle of the data reader so that a frequency of the first reference pattern is approximately constant when the data reader detects the first reference pattern when the first reference pattern is unobstructed.

16. The system of claim 5 wherein the first reference pattern comprises a series of holes extending through the top surface of the weigh platter to thereby create an alternating pattern of high and low reflectance sections on the top surface of the weigh platter.

17. The system of claim 5 wherein the first reference pattern comprises a series of stamped depressions, whereby the stamped depressions create an alternating pattern of high and low reflectance sections on the top surface of the weigh platter.

18. The system of claim 5 wherein the first reference pattern comprises a plurality of spaced apart retroreflective sections to thereby create an alternating pattern of high and low reflectance sections on the top surface of the weigh platter.

19. The system of claim 5 wherein the top surface of the weigh platter is brushed in a direction substantially parallel to a scan direction of the item to thereby create a high reflectance surface that is resistant to wear.

20. A method for reducing weighing errors of an item being weighed on a weigh platter associated with a data reader, said weigh platter including a top surface having first and second lateral edges that are adjacent a checkout counter or other fixed object, the method comprising the steps of:
  scanning, via the data reader, a first reference pattern positioned on the top surface proximate and along a first lateral edge of the top surface of the weigh platter;
  determining whether a full extent of the first reference pattern is detected by the data reader; and
  determining whether an item rests partially off the weigh platter based on whether the data reader detected the full extent of the first reference pattern.

21. The method of claim 20, wherein the data reader comprises an imaging based scanning system and wherein the step of scanning the first reference pattern comprises capturing an image corresponding to a location of the first reference pattern and analyzing the captured image to determine whether a number of edge transitions in the captured image corresponds to a number of edge transitions in the full extent of the first reference pattern.

22. The method of claim 20, wherein the data reader comprises a laser based scanning system and wherein the step of scanning the first reference pattern comprises
  projecting a scan line along the full extent of the first reference pattern and monitoring light reflected by the first reference pattern for a frequency of the first reference pattern over the scan line.

23. The method of claim 20, further comprising:
  upon determining that an item rests partially off the weigh platter, notifying an operator that an item rests partially off the weigh platter.

24. A system for reducing weighing errors of an item being weighed on a weigh platter associated with a data reader disposed in a checkout counter of other station, the system comprising:
  a weigh platter including a top surface with first and second lateral edges;
  an imager configured to capture an image of a portion of the top surface of the weigh platter, including regions proximate and along the first and second lateral edges of the top surface of the weigh platter;
  a memory for storing a reference image, the reference image comprising an image of the portion of the top surface of the weigh platter when an item does not rest partially off the weigh platter; and
  a processor coupled to the imager and the memory, the processor configured to cause the imager to capture an image of the portion of the top surface of the weigh platter and determine whether an item rests partially off the weigh platter based on a comparison of the captured image and the reference image.

25. The system of claim 24, wherein the data reader comprises an imaging based scanning system including an image sensor and the imager comprises the image sensor of the imaging based scanning system.

26. The system of claim 24, wherein the processor is configured to calculate a sum-of-absolute-differences between corresponding pairs of captured image pixels and reference image pixels to determine whether an item rests partially off the weigh platter.

27. The system of claim 24, further comprising:
  external indicia configured to notify an operator of whether an item rests partially off the weigh platter.

28. A method for reducing weighing errors of an item being weighed on a weigh platter associated with a data reader, said weigh platter including a top surface having first and second lateral edges that are adjacent a checkout counter or other fixed object, the method comprising the steps of:
  capturing an image of a portion of the top surface of the weigh platter including regions proximate and along the first edge of the top surface of the weigh platter;
  comparing the captured image with a reference image, the reference image comprising an image of a portion of the top surface of the weigh platter including regions proximate and along the adjacent first and second lateral edges of the top surfaces of the weigh platter when an item does not rest partially off the weigh platter; and
  based on the comparing of the captured image and the reference image, determining whether an item rests partially off the weigh platter.

29. The method of claim 28, wherein the image is captured in response to a request received from a host.

30. The method of claim 28, wherein the step of comparing the captured image with a reference image comprises calculating a sum-of-absolute-differences between corresponding pairs of captured image pixels and reference image pixels.

31. The method of claim 28, further comprising:
  isolating a set of captured image pixels corresponding to the first edge of the top surface of the weigh platter, wherein the isolated set of captured image pixels are compared to corresponding reference image pixels.

32. The method of claim 28, further comprising:
  periodically capturing an updated reference image, the updated reference image comprising an image of a portion of the top surface of the weigh platter including regions proximate and along the first edge of the top surface of the weigh platter when an item does not rest partially off the weigh platter; and
  updating the reference image with the updated reference image.

33. A system for reducing weighing errors of an item being weighed on a weigh platter associated with a data reader, the system comprising:
  a weigh platter including a top surface with a peripheral edge that is adjacent a checkout counter or other fixed object;
  a radiating antenna disposed proximate and to one side of the peripheral edge of the weigh platter, the radiating antenna configured to transmit electromagnetic waves across the peripheral edge of the weigh platter;
  a receiving antenna disposed on a side of the peripheral edge of the weigh platter opposite the radiating antenna. the receiving antenna configured to receive the electromagnetic waves from the radiating antenna;
  a transmitter coupled to the radiating antenna, the transmitter configured to drive the radiating antenna with a signal so that the radiating antenna transmits the electromagnetic waves across the peripheral edge of the weigh platter;
  a receiver coupled to the receiving antenna, the receiver configured to monitor the receiving antenna for an alteration in a coupling of the electromagnetic waves from the radiating antenna to the receiving antenna to determine whether an item rests partially off the weigh platter, wherein the radiating antenna is configured to transmit electromagnetic waves within the range of approximately three megahertz to approximately thirty megahertz and the receiving antenna is configured to receive electromagnetic waves within the range of approximately three megahertz to approximately thirty megahertz.

34. The system of claim 33, wherein the radiating antenna comprises the weigh platter.

35. The system of claim 33, wherein the receiving antenna comprises a loop of wire at least partially surrounding the weigh platter.

36. The system of claim 33, further comprising:
a controller coupled to the receiver, the controller configured to monitor an output of the receiver to determine whether an item rests partially off the weigh platter.

37. The system of claim 33, further comprising:
external indicia configured to notify an operator of whether an item rests partially off the weigh platter.

38. A method for reducing weighing errors of an item being weighed on a weigh platter associated with a data reader, the method comprising:
transmitting electromagnetic waves across a peripheral edge of the weigh platter from a radiating antenna to a receiving antenna;
monitoring the receiving antenna to detect an alteration in a coupling of the electromagnetic waves from the radiating antenna to the receiving antenna;
determining whether an item rests partially off the weigh platter based whether an alteration in the coupling of the electromagnetic waves from the radiating antenna to the receiving antenna is detected, wherein the step of monitoring the receiving antenna to detect an alteration in a coupling of the electromagnetic waves from the radiating antenna to the receiving antenna comprises comparing an amplitude of the electromagnetic waves received at the receiving antenna to a predetermined threshold;
periodically measuring an amplitude of the electromagnetic waves received at the receiving antenna when an item does not rest partially off the weigh platter; and
updating the predetermined threshold with the measured amplitude.

39. A method for reducing weighing errors of an item being weighed on a weigh platter associated with a data reader, the method comprising:
transmitting electromagnetic waves across a peripheral edge of the weigh platter from a radiating antenna to a receiving antenna;
monitoring the receiving antenna to detect an alteration in a coupling of the electromagnetic waves from the radiating antenna to the receiving antenna;
determining whether an item rests partially off the weigh platter based whether an alteration in the coupling of the electromagnetic waves from the radiating antenna to the receiving antenna is detected;
configuring the weigh platter to form a radiating antenna.

40. A system for reducing weighing errors of an item being weighed on a weigh platter associated with a data reader, the system comprising:
a weigh platter including a top surface with first and second opposing edges;
a housing section including a lower housing section supporting the weigh platter and an upper housing section rising above a top surface of the weigh platter on a side of the weigh platter that extends between the first and second opposing edges;
a first set of transducers disposed along the adjacent first and second edges of the top surface, the first set of transducers configured to transmit or receive non-electromagnetic compression waves;
a second set of transducers disposed on the upper housing section, the second set of transducers configured to transmit or receive non-electromagnetic compression waves;
a transmitter coupled to one of the first set of transducers or the second set of transducers, the transmitter configured to drive the set of transducers with a signal so that the set of transducers transmit non-electromagnetic compression waves; and
a receiver coupled to the other one of the first set of transducers or the second set of transducers, the receiver configured to monitor the set of transducers coupled to the receiver for an alteration in amplitude of incident compression waves transmitted by the set of transducers driven by the transmitter to determine whether an item rests partially off the weigh platter.

41. The system of claim 40, wherein
the first set of transducers comprise a plurality of individual linearly-aligned transducers configured to transmit non-electromagnetic compression waves,
the transmitter is coupled to the first set of transducers,
the second set of transducers comprise a single transducer configured to receive the compression waves transmitted by the first set of transducers, and
the receiver is coupled to the second set of transducers.

42. The system of claim 40, wherein
the second set of transducers comprise a single transducer configured to transmit non-electromagnetic compression waves,
the transmitter is coupled to the second set of transducers,
the first set of transducers comprise a plurality of individual linearly-aligned transducers configured to receive the compression waves transmitted by the first set of transducers, and
the receiver is coupled to the first set of transducers.

43. The system of claim 40, wherein the first and second sets of transducers comprise a piezoelectric film.

44. The system of claim 40, wherein the first and second sets of transducers are configured to transmit or receive non-electromagnetic compression waves within the range of approximately 200 kilohertz to approximately 400 kilohertz.

45. The system of claim 40, further comprising:
a controller coupled to the receiver, the controller configured to monitor an output of the receiver to determine whether an item rests partially off the weigh platter.

46. The system of claim 40, further comprising:
external indicia configured to notify an operator whether an item rests partially on the weigh platter and partially on the checkout counter or other fixed object.

47. A method for reducing weighing errors of an item being weighed on a weigh platter associated with a data reader, said data reader including an upper housing section rising above a top surface of the weigh platter, a first set of transducers positioned along at least a portion of a peripheral edge of the weigh platter, and a second set of transducers disposed on the upper housing section, said first and second sets of transducers configured to transmit or receive non-electromagnetic compression waves, the method comprising:
transmitting from a set of emitters to a set of sensors non-electromagnetic compression waves, the set of emitters comprising one of the first set of transducers or the second set of transducers and the set of sensors comprising the other one of the first set of transducers or the second set of transducers;

monitoring the set of sensors to detect an alteration in amplitude of incident compression waves transmitted by the set of emitters; and determining whether an item rests partially off the weigh platter based whether an alteration in the amplitude of incident compression waves transmitted by the set of emitters is detected at the set of sensors.

48. The method of claim 47, wherein the set of emitters comprise the second set of transducers and the set of sensors comprise the first set of transducers.

49. The method of claim 47, wherein the first set of transducers comprise a plurality of individual linearly-aligned transducers and the second set of transducers comprise a single transducer.

50. The method of claim 47, wherein the step of monitoring the set of sensors to detect an alteration in amplitude of incident compression waves transmitted by the set of emitters comprises comparing an amplitude of the incident compression waves received by the set of sensors to a predetermined threshold.

51. The method of claim 50, further comprising:

periodically measuring an amplitude of the compression waves received by the set of sensors when an item does not rest partially off the weigh platter; and updating the predetermined threshold with the measured amplitude.

52. A system for reducing weighing errors of an item being weighed on a weigh platter associated with a data reader installed in a checkout counter of other fixed object, the system comprising:

a weigh platter including a top surface with first and second opposing edges that are adjacent the checkout counter or other fixed object;

a first set of transducers disposed along the adjacent first edges of the top surface, the first set of transducers configured to transmit and receive non-electromagnetic compression waves;

a second set of transducers disposed along the adjacent second edges of the top surface, the second set of transducers configured to transmit and receive non-electromagnetic compression waves;

a transmitter coupled to the first and second sets of transducers, the transmitter configured to drive the transducers with a signal so that the transducers transmit non-electromagnetic compression waves away from the top surface of the weigh platter; and a receiver coupled to the first and second sets of transducers, the receiver configured to monitor the transducers to detect compression waves reflected by an item toward the top surface of the weigh platter to determine whether an item rests partially off the weigh platter.

* * * * *

UNITED STATES PATENT AND TRADEMARK OFFICE
CERTIFICATE OF CORRECTION

| | |
|---|---|
| PATENT NO. | : 8,552,313 B2 |
| APPLICATION NO. | : 12/634252 |
| DATED | : October 8, 2013 |
| INVENTOR(S) | : Charles Forrister Atwater, Alexander M. McQueen and Patrick M. O'Donnell |

Page 1 of 2

It is certified that error appears in the above-identified patent and that said Letters Patent is hereby corrected as shown below:

Specification

Column 1
Line 10, change "a" to --are--.
Line 64, after "example" delete "a".

Column 2
Line 6, after "FIG. 8" insert --is--.
Line 28, change "an" to --a--.

Column 3
Line 52, after "opposing" delete "or".

Column 4
Lines 6-7, after "and" insert --(4)-- and delete "is the lateral side".

Column 5
Line 49, after "image" insert --of--.

Column 12
Line 50, after "installed" insert --along--.

Column 15
Line 59, change "transducer" to --transducers--.
Line 64, after "positioned" insert --along--.

Column 16
Line 61, change "drive" to --drives--.

Signed and Sealed this
Twenty-fourth Day of November, 2015

Michelle K. Lee
*Director of the United States Patent and Trademark Office*

Column 17
Line 27, before "utilizes" insert --that--.

Column 22
Line 6, before "stood" insert --be--.

Column 26
Line 16, before "rising" delete "which" and before "extending" insert --and--.

Column 33
Line 2, after "provided" insert --along--.

Claims

Column 38
Line 48, claim 1, after "platter;" delete "and".
Line 54, claim 1, after "platter;" delete "and".

Column 41
Line 46, claim 24, change "of" to --or--.

Column 43
Line 34, claim 38, after "based" insert --on--.
Line 57, claim 39, after "based" insert --on--.

Column 45
Line 9, claim 47, after "based" insert --on--.

Column 46
Line 5, claim 52, change "of" to --or--.